US008504798B2

(12) United States Patent
Conley et al.

(10) Patent No.: US 8,504,798 B2
(45) Date of Patent: Aug. 6, 2013

(54) MANAGEMENT OF NON-VOLATILE MEMORY SYSTEMS HAVING LARGE ERASE BLOCKS

(75) Inventors: Kevin M. Conley, San Jose, CA (US); Carlos J. Gonzalez, Los Gatos, CA (US)

(73) Assignee: SanDisk Technologies Inc., Plano, TX (US)

( * ) Notice: Subject to any disclaimer, the term of this patent is extended or adjusted under 35 U.S.C. 154(b) by 1571 days.

(21) Appl. No.: 10/749,831

(22) Filed: Dec. 30, 2003

(65) Prior Publication Data

US 2005/0144358 A1 Jun. 30, 2005

(51) Int. Cl.
*G06F 12/00* (2006.01)
*G06F 13/00* (2006.01)

(52) U.S. Cl.
USPC ............................ 711/218; 711/100; 711/103

(58) Field of Classification Search
USPC .......................................... 711/100, 103, 218
See application file for complete search history.

(56) References Cited

U.S. PATENT DOCUMENTS

| | | |
|---|---|---|
| 5,043,940 A | 8/1991 | Harari |
| 5,070,032 A | 12/1991 | Yuan et al. |
| 5,095,344 A | 3/1992 | Harari |
| 5,172,338 A | 12/1992 | Mehrotra et al. |
| 5,313,421 A | 5/1994 | Guterman et al. |
| 5,315,541 A | 5/1994 | Harari et al. |
| 5,341,330 A | 8/1994 | Wells et al. |
| 5,341,489 A | 8/1994 | Heiberger et al. |
| 5,343,063 A | 8/1994 | Yuan et al. |
| 5,404,485 A | 4/1995 | Ban |
| 5,457,658 A | 10/1995 | Niijima et al. |
| 5,479,638 A | 12/1995 | Assar et al. |
| 5,481,691 A | 1/1996 | Day, III et al. |
| 5,485,595 A | 1/1996 | Assar et al. |

(Continued)

FOREIGN PATENT DOCUMENTS

| | | |
|---|---|---|
| EP | 1 89 139 A1 | 3/2002 |
| EP | 1 189 139 A1 | 3/2002 |

(Continued)

OTHER PUBLICATIONS

EPO/ISA, "Notification of Transmittal of the International Search Report and the Written Opinion of the International Searching Authority, or the Declaration", mailed in corresponding PCT/US2004/042644 on May 10, 2005, 10 pages.

(Continued)

*Primary Examiner* — Tuan Thai
(74) *Attorney, Agent, or Firm* — Davis Wright Tremaine LLP

(57) ABSTRACT

A non-volatile memory system of a type having blocks of memory cells erased together and which are programmable from an erased state in units of a large number of pages per block. If the data of only a few pages of a block are to be updated, the updated pages are written into another block provided for this purpose. The valid original and updated data are then combined at a later time, when doing so does not impact on the performance of the memory. If the data of a large number of pages of a block are to be updated, however, the updated pages are written into an unused erased block and the unchanged pages are also written to the same unused block. By handling the updating of a few pages differently, memory performance is improved when small updates are being made.

19 Claims, 12 Drawing Sheets

U.S. PATENT DOCUMENTS

| | | | |
|---|---|---|---|
| 5,537,577 A | 7/1996 | Sugimura et al. | |
| 5,541,886 A | 7/1996 | Hasbun | |
| 5,570,315 A | 10/1996 | Tanaka et al. | |
| 5,572,466 A | 11/1996 | Sukegawa | |
| 5,598,370 A | 1/1997 | Niijima et al. | |
| 5,648,929 A | 7/1997 | Miyamoto | |
| 5,649,200 A | 7/1997 | Leblang et al. | |
| 5,661,053 A | 8/1997 | Yuan | |
| 5,774,397 A | 6/1998 | Endoh et al. | |
| 5,798,968 A | 8/1998 | Lee et al. | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,860,090 A | 1/1999 | Clark | |
| 5,890,192 A | 3/1999 | Lee et al. | |
| 5,896,393 A | 4/1999 | Yard et al. | |
| 5,907,856 A | 5/1999 | Estakhri et al. | |
| 5,930,167 A | 7/1999 | Lee et al. | |
| 5,986,933 A | 11/1999 | Takeuchi et al. | |
| 5,987,563 A | 11/1999 | Itoh et al. | |
| 5,999,947 A | 12/1999 | Zollinger et al. | |
| 6,040,997 A | 3/2000 | Estakhri | |
| 6,046,935 A | 4/2000 | Takeuchi et al. | |
| 6,115,785 A | 9/2000 | Estakhri et al. | |
| 6,122,195 A | 9/2000 | Estakhri et al. | |
| 6,125,435 A | 9/2000 | Estakhri et al. | |
| 6,134,151 A | 10/2000 | Estakhri et al. | |
| 6,151,247 A | 11/2000 | Estakhri et al. | |
| 6,161,163 A | 12/2000 | Komatsu et al. | |
| 6,219,768 B1 | 4/2001 | Hirabayshi et al. | |
| 6,222,762 B1 | 4/2001 | Guterman et al. | |
| 6,330,634 B1 | 12/2001 | Fuse et al. | |
| 6,426,893 B1 | 7/2002 | Conley et al. | |
| 6,449,625 B1 | 9/2002 | Wang | |
| 6,456,528 B1 | 9/2002 | Chen | |
| 6,507,885 B2 | 1/2003 | Lakhani et al. | |
| 6,522,580 B2 | 2/2003 | Chen et al. | |
| 6,567,307 B1 | 5/2003 | Estakhri | |
| 6,598,171 B1 | 7/2003 | Farmwald et al. | |
| 6,662,264 B2 | 12/2003 | Katayama et al. | |
| 6,721,843 B1 | 4/2004 | Estakhri | |
| 6,763,424 B2 | 7/2004 | Conley et al. | |
| 6,775,423 B2 | 8/2004 | Kulkarni et al. | |
| 6,834,331 B1 | 12/2004 | Liu | |
| 6,839,798 B1 | 1/2005 | Nagayoshi et al. | |
| 6,968,421 B2 | 11/2005 | Conley | |
| 7,020,739 B2 | 3/2006 | Mukaida et al. | |
| 7,024,514 B2 | 4/2006 | Mukaida et al. | |
| 7,062,630 B2 | 6/2006 | Otake et al. | |
| 7,107,388 B2 | 9/2006 | Zimmer et al. | |
| 7,328,301 B2 | 2/2008 | Eilert et al. | |
| 2002/0034105 A1* | 3/2002 | Kulkarni et al. | 365/200 |
| 2002/0099904 A1 | 7/2002 | Conley | |
| 2003/0109093 A1 | 6/2003 | Harari et al. | |
| 2003/0110343 A1 | 6/2003 | Hagiwara et al. | |
| 2005/0144361 A1 | 6/2005 | Gonzalez et al. | |

FOREIGN PATENT DOCUMENTS

| | | |
|---|---|---|
| FR | 2 742 893 A1 | 6/1997 |
| JP | 11-053248 A | 2/1999 |
| JP | 2000-122923 A | 4/2000 |
| JP | 2000-285017 A | 10/2000 |
| JP | 2002-202912 A | 7/2002 |
| JP | 2003-006044 A | 10/2003 |
| JP | 2004-533029 T | 10/2004 |
| WO | WO 94/20906 A1 | 9/1994 |
| WO | WO 94/22075 A1 | 9/1994 |
| WO | WO 02/05285 A2 | 1/2002 |
| WO | WO 02/49309 A2 | 6/2002 |
| WO | WO 02/058074 A2 | 7/2002 |

OTHER PUBLICATIONS

"Preliminary Notice of Rejection of the IPO" for SanDisk Corporation, Chinese Application No. 093140808 mailed Nov. 10, 2006, 2 pages.

USPTO, "Office Action," mailed in related U.S. Appl. No. 10/750,190 on Jun. 20, 2007, 10 pages.

Response to Office Action filed in related U.S. Appl. No. 10/750,190 on Oct. 29, 2007, 7 pages.

The Patent Office of the People's Republic of China, "Second Office Action," mailed in related Chinese Patent Application No. 200480039298.1 on Feb. 5, 2008, 3 pages (translation).

"International Preliminary Examination Report", European Patent Office, Corresponding Application PCT/US02/00366, Jul. 4, 2003, 7 pages.

Petro Estakhri et al., "Moving Sectors Within a Block of Information in a Flash Memory Mass Storage Architecture", U.S. Appl. No. 09/620,544, filed Jul. 21, 2000, 48 pages.

PCT International Search Report, European Patent Office, corresponding PCT Application No. PCT/US02/00366, Apr. 7, 2003, 5 pages.

"FTL Updates, PCMCIA Document No. 0165", Personal Computer Memory Card International Association, Version 022, Release 003, Mar. 4, 1996, pp. 1-26.

Mergi, Aryeh and Schneider, Robert, "M-Systems & SCM Flash Filing Software Flash Translation Layer-FTL", PCMCIA, Jul. 1994, 15 pages.

EPO/ISA, "Notification of Transmittal of the International Search Report and the Written Opinion of the International Searching Authority, or the Declaration", mailed in related PCT/US2004/042862 on Sep. 12, 2005, 19 pages.

European Patent Office, "Office Action," mailed in related European Patent Application No. 04 814 991.8 on Jun. 6, 2007, 2 pages.

China State Intellectual Property Office, "First Office Action," corresponding related Chinese Patent Application No. 2004800416806 on Sep. 28, 2007, 18 pages.

Taiwan Intellectual Property Office, "Office Action of the IPO," corresponding related Taiwanese Patent Application No. 093140967 on Nov. 13, 2007, 5 pages.

USPTO, "Office Action," mailed in related U.S. Appl. No. 10/750,190 on Dec. 12, 2007, 14 pages.

EPO, "Office Action," corresponding European Patent Application No. 04 814 787.0 on Oct. 23, 2007, 8 pages.

The Patent Office of the People's Republic of China, "First Office Action," mailed in related Chinese Patent Application No. 200480039298 on Jun. 15, 2007, 7 pages (including translation).

China State Intellectual Property Office, "Office Action," corresponding Chinese Patent Application No. 200480039298.1, mailed on Jul. 11, 2008, 7 pages (including translation.).

China State Intellectual Property Office, "Office Action," corresponding Chinese Patent Application No. 200480039298.1, mailed on Nov. 28, 2008, 10 pages (including translation.).

China State Intellectual Property Office, "Decision of Refusal," corresponding Chinese Patent Application No. 200480039298.1, mailed on May 8, 2009, 12 pages (including translation.).

China State Intellectual Property Office, "Reexamination Notification," corresponding Chinese Patent Application No. 200480039298.1, mailed on Dec. 14, 2009, 6 pages (including translation.).

Korean Intellectual Property Office, "Notice of the Preliminary Rejection," corresponding Korean Patent Application No. 2006-7012947, mailed on Mar. 9, 2011, 4 pages (including translation.).

Japanese Patent Office, "Notification of Reasons for Refusal," corresponding Japanese Patent Application No. 2006-547192, mailed on Mar. 29, 2011, 6 pages (including translation.).

USPTO, "Notice of Allowance and Fee(s) Due," corresponding U.S. Appl. No. 12/433,702, mailed on Oct. 7, 2011, 18 pages.

USPTO, "Office Action," corresponding U.S. Appl. No. 12/609,789, mailed on Mar. 1, 2012, 11 pages.

* cited by examiner

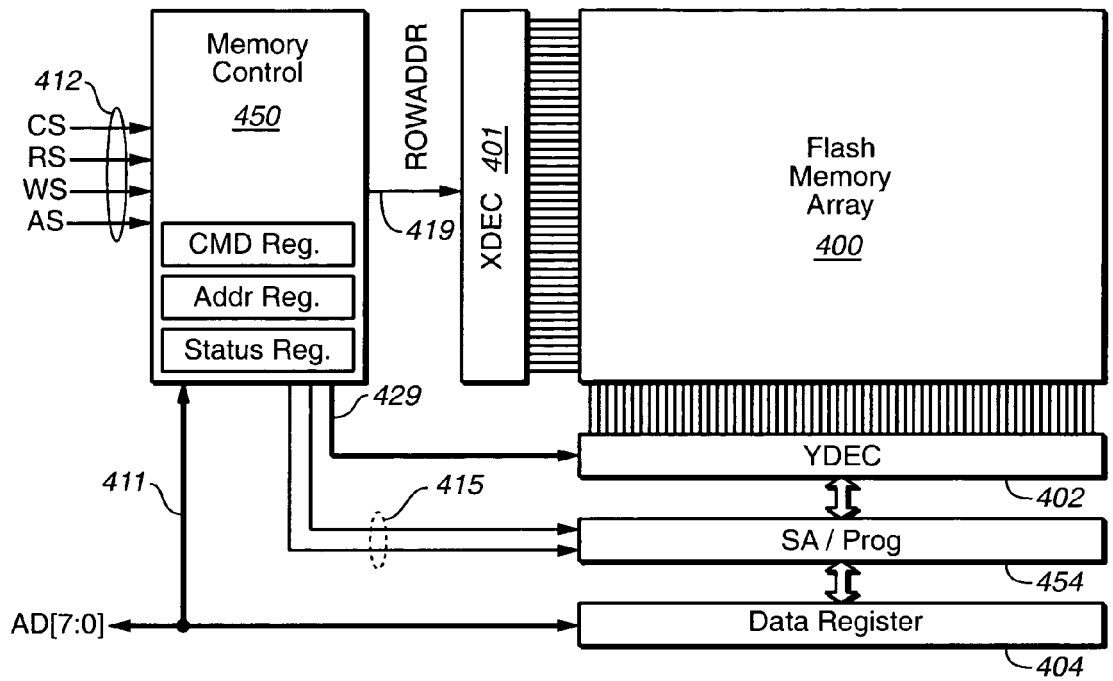
FIG._1
(PRIOR ART)
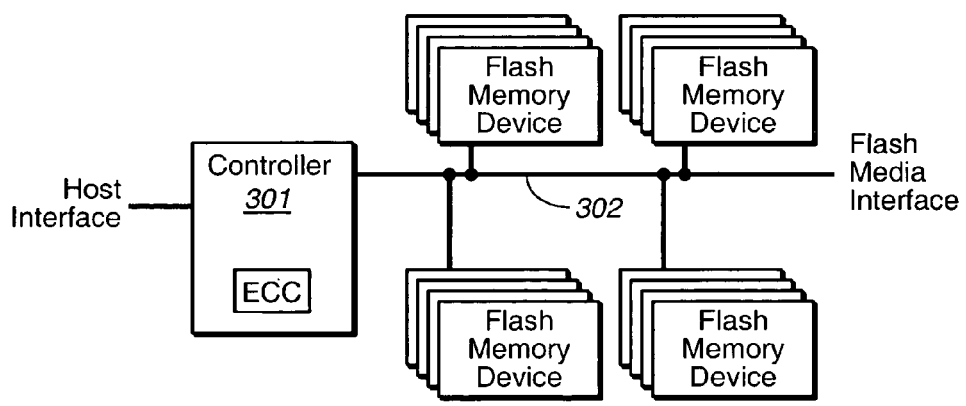
FIG._2
(PRIOR ART)

| Page 0 |
|---|
| Page 1 |
| Page 2 |
| Page 3 |
| Page 4 |
| Page 5 |
| Page 6 |
| Page 7 |
| Page 8 |
| Page 9 |
| Page 10 |
| Page 11 |
| Page 12 |
| Page 13 |
| Page 14 |
| Page 15 |
FIG. 4
*(PRIOR ART)*
| LBN | PBN |
|---|---|
| 0 | 0 |
| 1 | 1 |
| 2 | 2 |
| 3 | 3 |
| 4 | 4 |
| 5 | 5 |
FIG. 7A
*(PRIOR ART)*
| LBN | PBN |
|---|---|
| 0 | 0 |
| 1 | 1 |
| 2 | 2 |
| 3 | 13 |
| 4 | 4 |
| 5 | 5 |
FIG. 7B
*(PRIOR ART)*
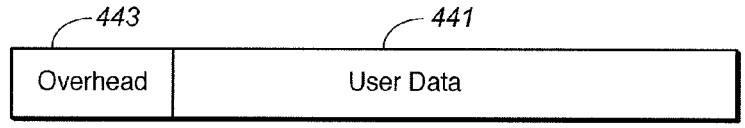
FIG. 5
*(PRIOR ART)*
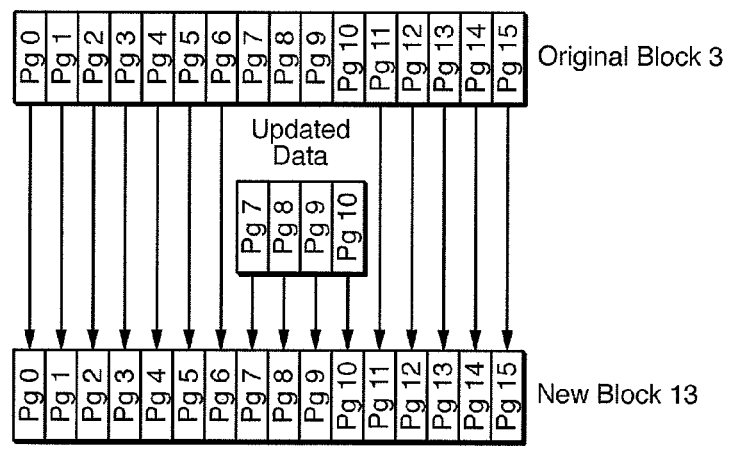
FIG. 6
*(PRIOR ART)*

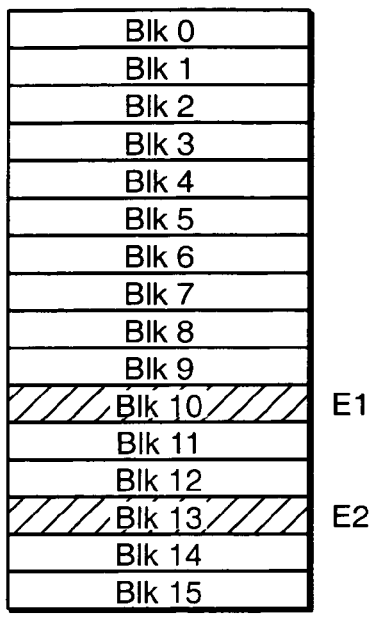
FIG._8
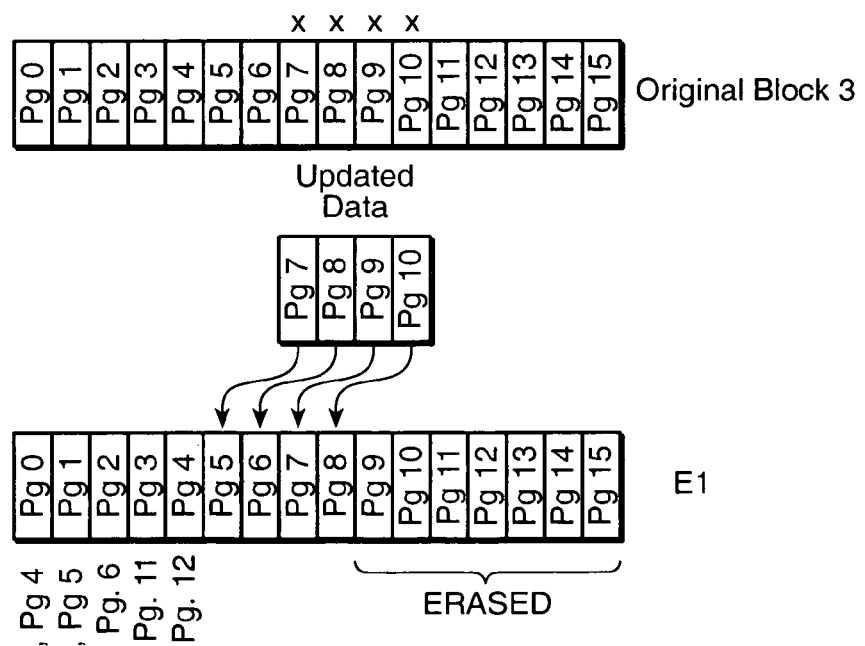
FIG._9

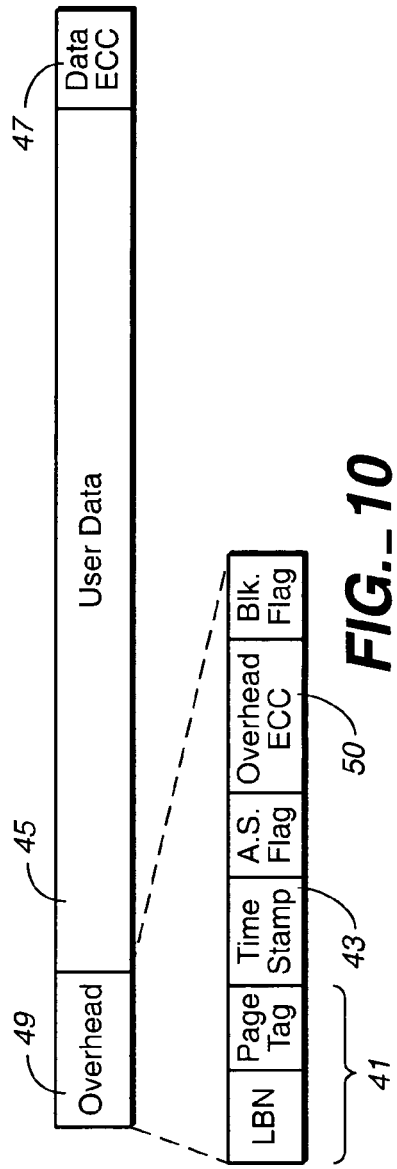
FIG._10
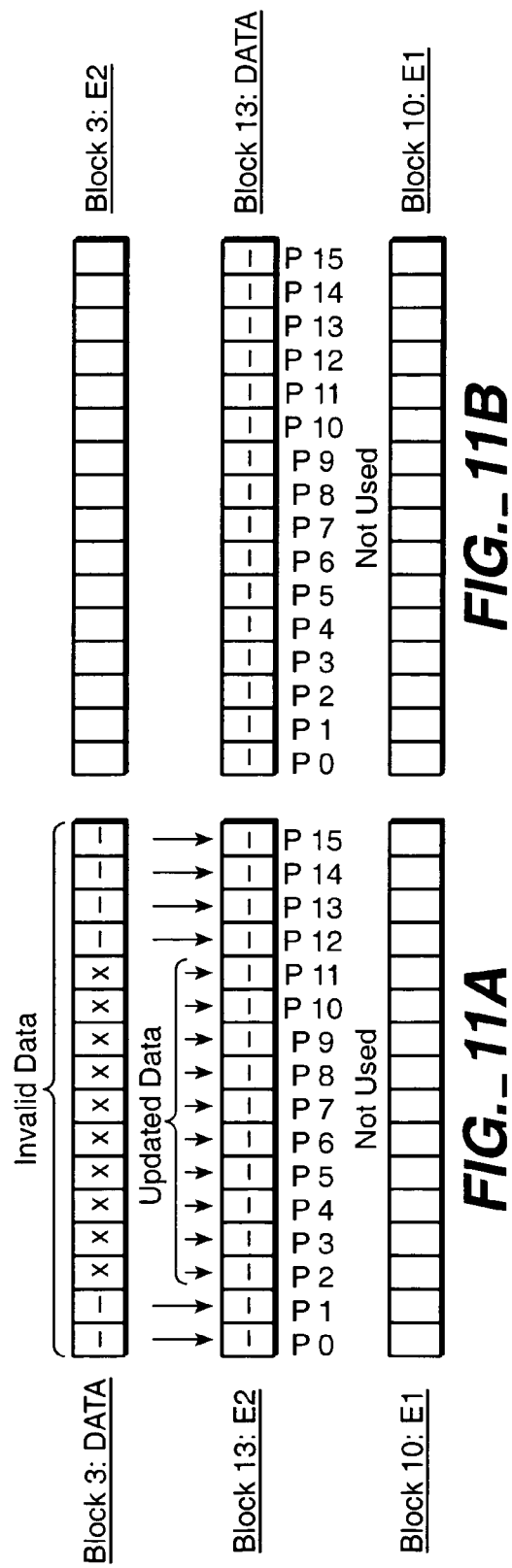
FIG._11A
FIG._11B

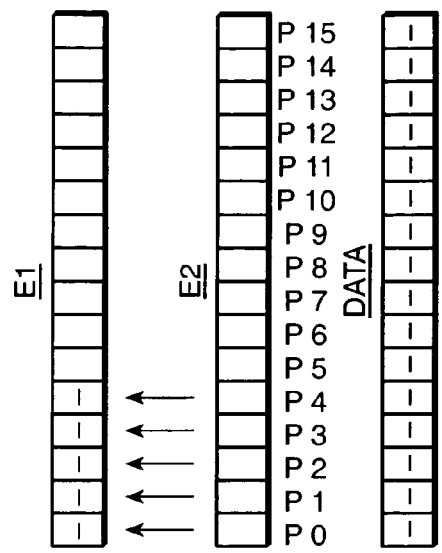
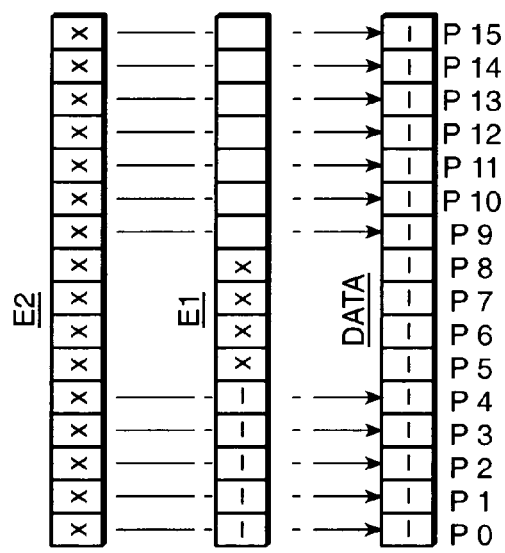
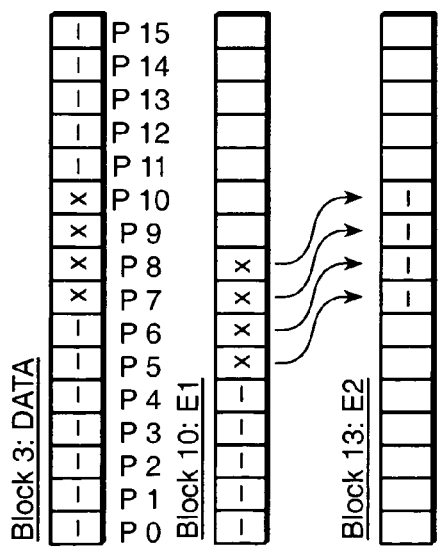
FIG._12C
FIG._12B
FIG._12A
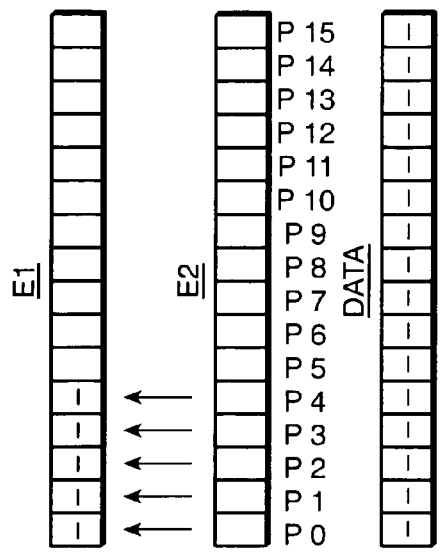
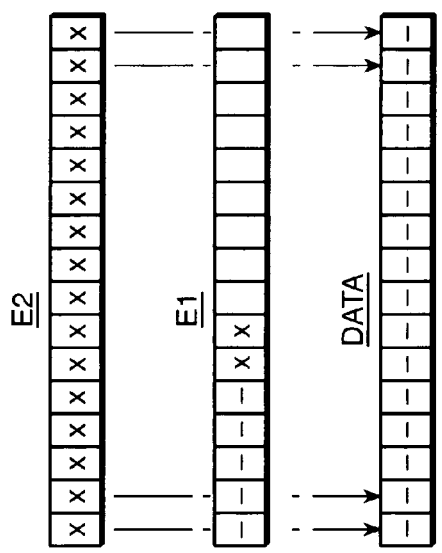
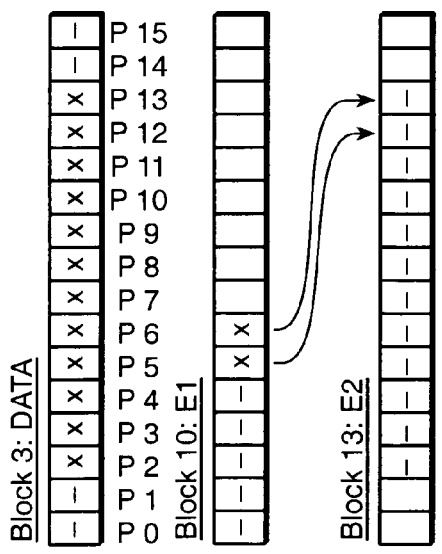
FIG._13C
FIG._13B
FIG._13A

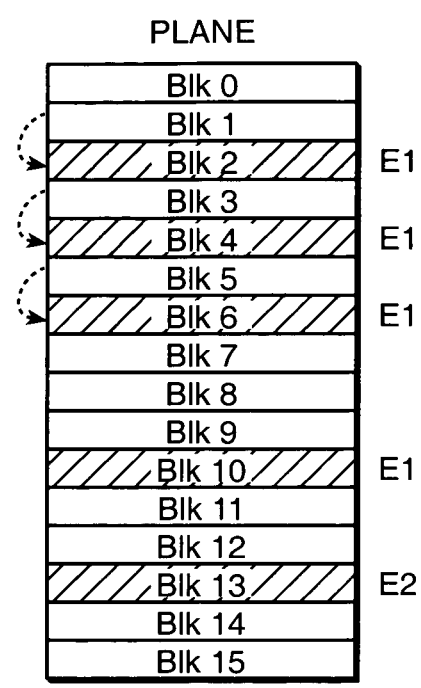
FIG._14

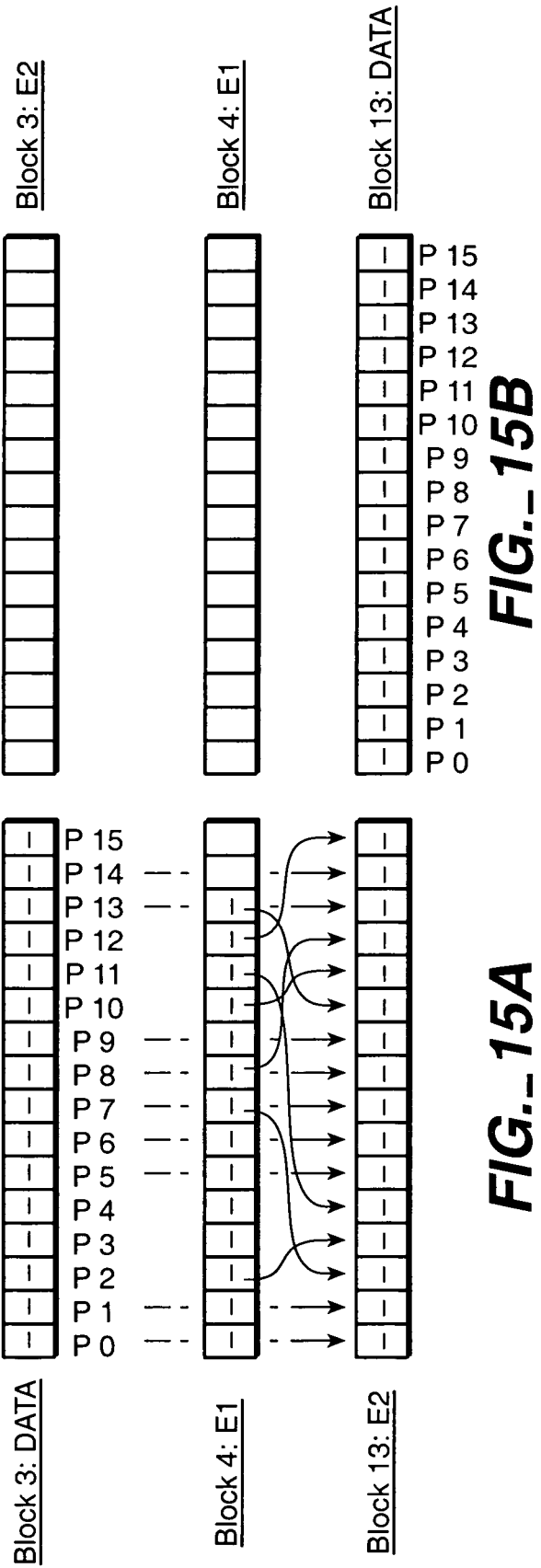
FIG._15A
FIG._15B

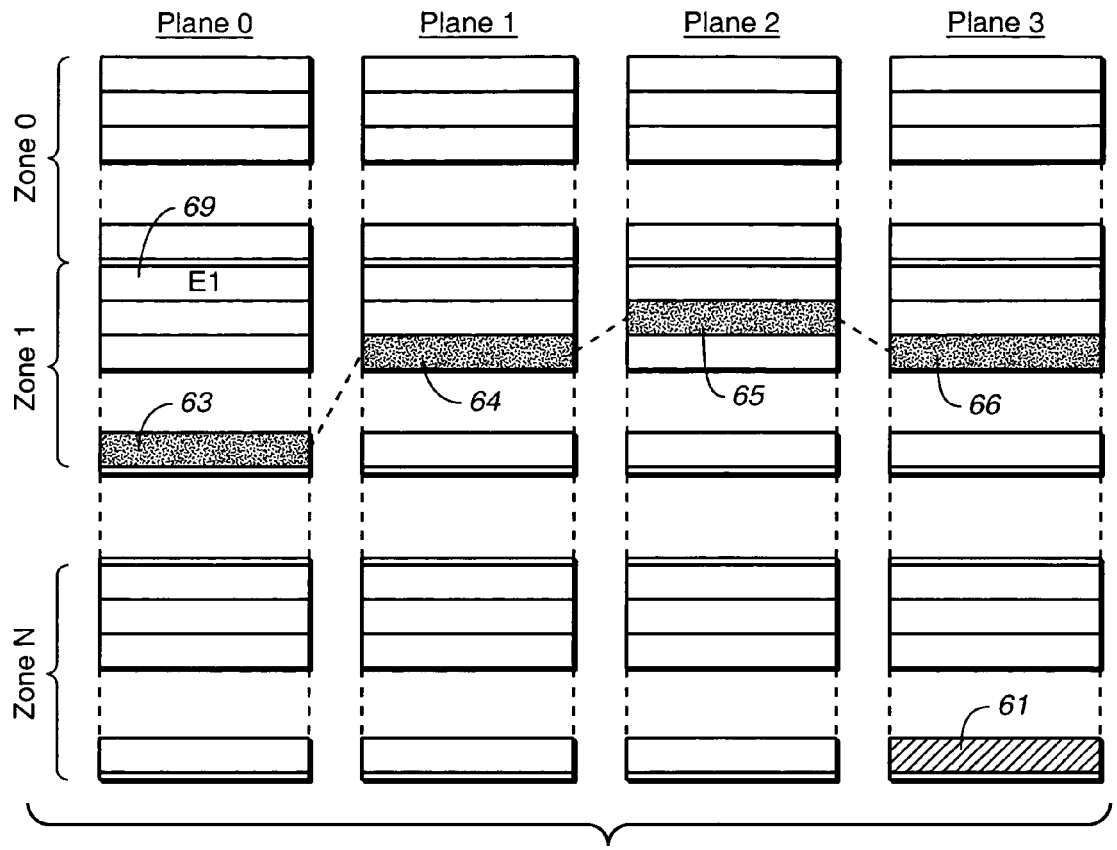
FIG._16
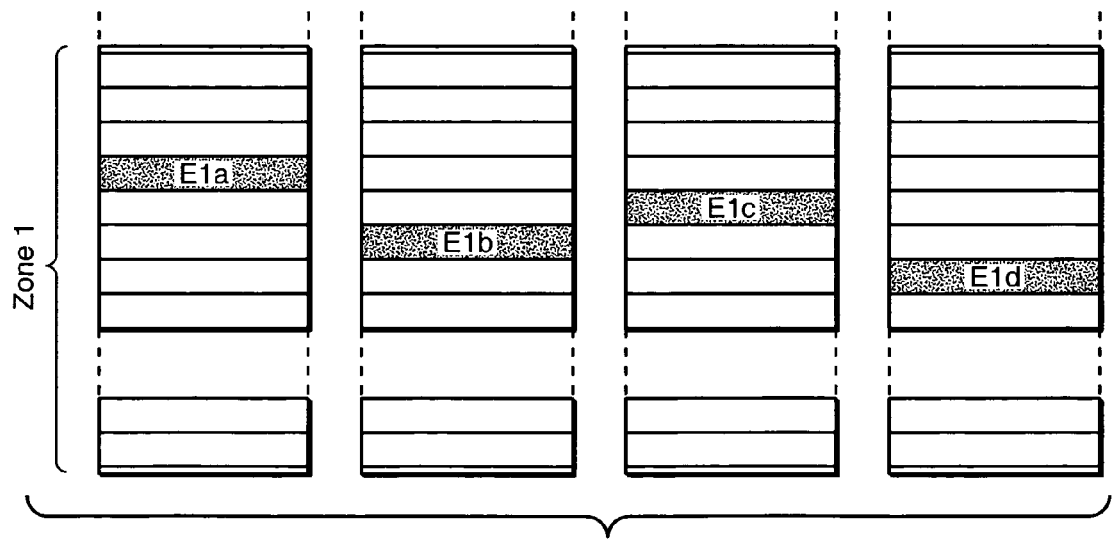
FIG._17

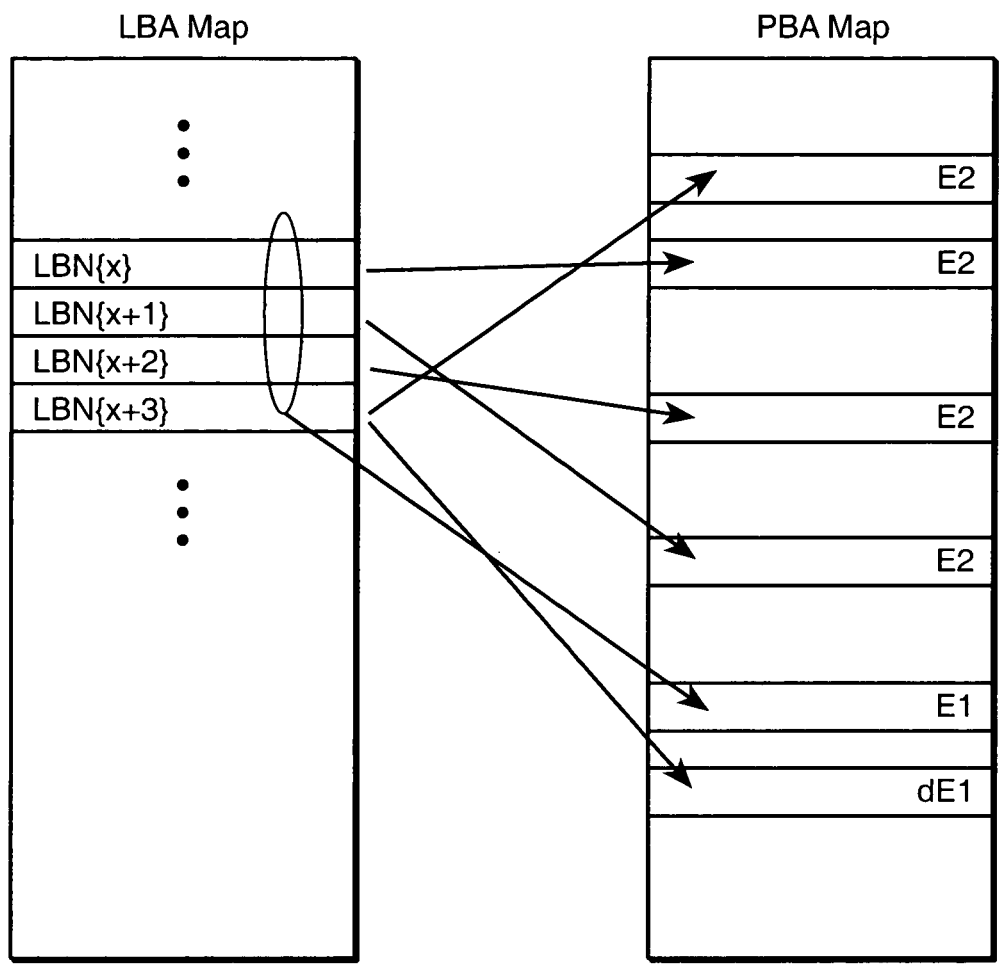
FIG._18

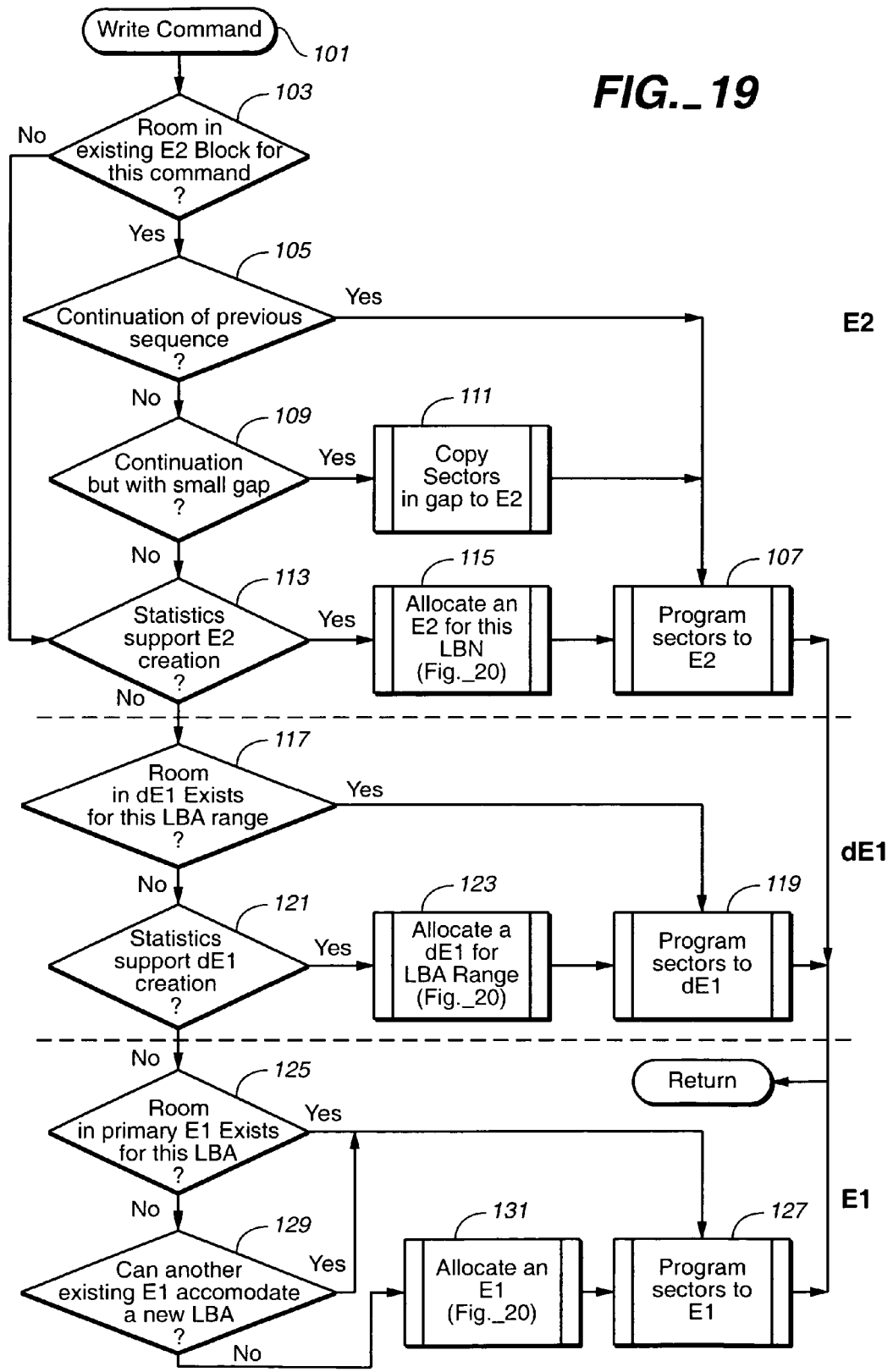
FIG._19

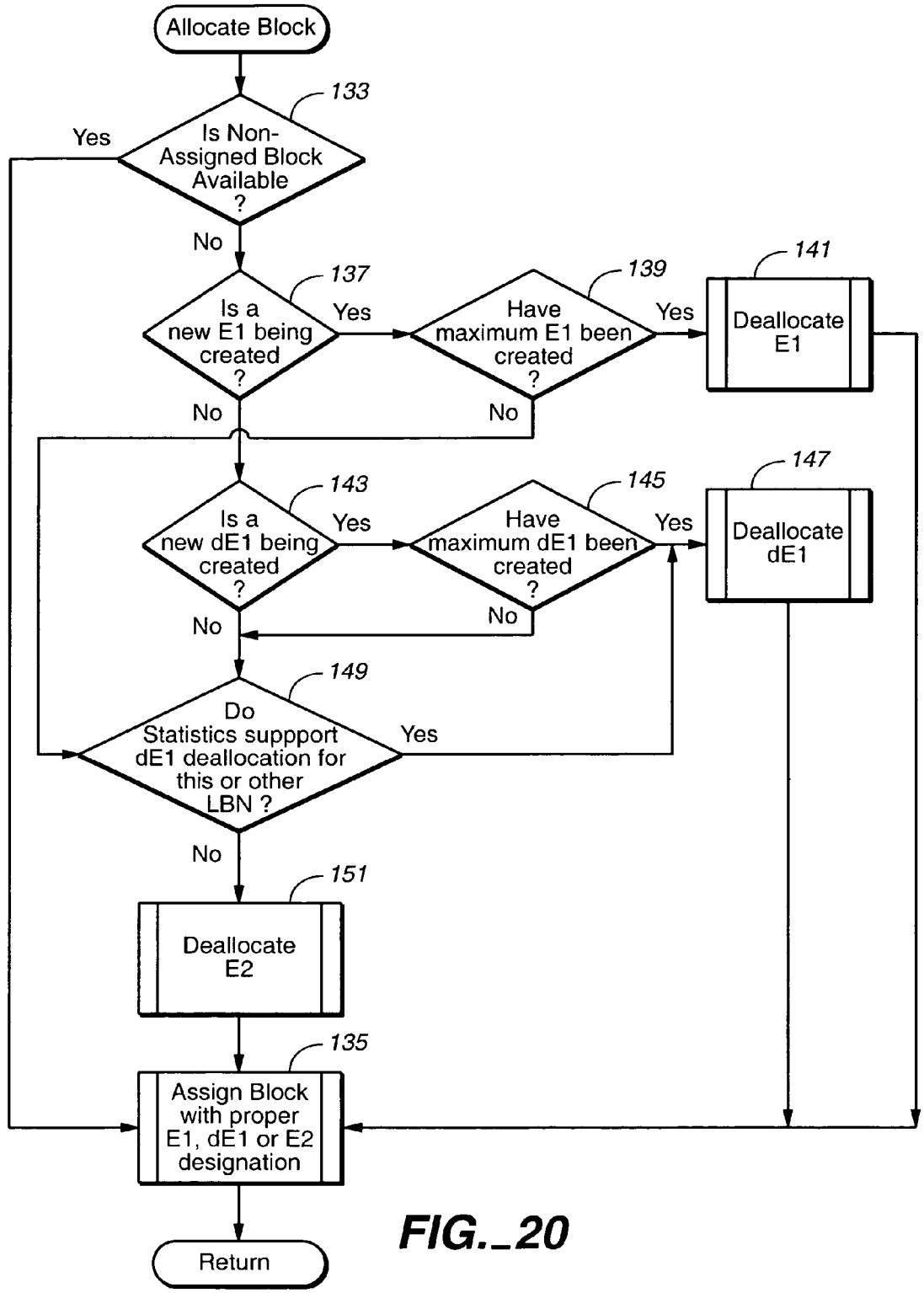
FIG._20

MANAGEMENT OF NON-VOLATILE MEMORY SYSTEMS HAVING LARGE ERASE BLOCKS

BACKGROUND

This invention relates generally to the operation of semiconductor non-volatile memory systems such as flash memory, and, more specifically, to the operation of such memory systems having very large erasable memory cell blocks and which access the blocks in much smaller units for programming and reading data.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. Besides the memory card implementation, this type of memory can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents, are most commonly electrically conductive floating gates, typically formed from conductively doped polysilicon material.

An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described by Harari et al. in United States patent application publication no. 2003/0109093.

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. The charge level of a storage element controls the threshold voltage (commonly referenced as VT) of its memory cell, which is used as a basis of reading the storage state of the cell. A threshold voltage window is commonly divided into a number of ranges, one for each of the two or more storage states of the memory cell. These ranges are separated by guard bands that individually include a nominal sensing reference level for reading the storage states of the individual cells.

Multiple state flash EEPROM structures using floating gates and their operation are described in U.S. Pat. Nos. 5,043,940 and 5,172,338, and for structures using dielectric floating gates in aforementioned U.S. application Ser. No. 10/280,352, publication no. 2003/0109093 A1. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the block is the erase unit, a minimum number of cells that are simultaneously erasable. Each block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Such memories are typically configured with 16, 32 or more pages within each block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, blocks may be linked together to form virtual blocks or metablocks. That is, each metablock is defined to include one block from each of several or all of the planes. Use of the metablock is described in United States patent application publication no. 2002-0099904. The metablock is identified by a host logical block address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNs) within the memory cell array. An intermediate quantity of logical block numbers (LBNs) may also be used, one LBN typically designating a range of LBAs that include an amount of data equal to the storage capacity of one or more memory array blocks or of a metablock. Individual pages within the blocks are typically identified by offsets within the block address. Address translation often involves uses logical block numbers (LBNs) and logical pages.

In an ideal case, the data in all the pages of a block would be updated together by writing the updated data to the pages within an unassigned, erased block, and a logical-to-physical block number table would then be updated with the new address. The original block would then be available to be erased and placed in an erased block pool for future use. However, it is more typical that the data stored in a number of pages less than all of the pages within a given block must be updated. The data stored in the remaining pages of the given block remain unchanged. The probability of this occurring is higher in systems in which the number of pages of data stored per block is higher. One technique now used to accomplish such a partial block update is to write the data of the pages to be updated into a corresponding number of the pages of an erased block and then to copy the unchanged pages from the original block into pages of the new block. The original block may then be erased and added to the erased block pool. Over time, as a result of host data files being re-written and updated, many blocks can end up with a relatively few number of its pages containing valid data and remaining pages containing data that are no longer current. In order to be able to efficiently use the data storage capacity of the array, logically related data pages of valid data are from time-to-time gathered together from fragments among multiple blocks and consolidated together into a fewer number of blocks. This process is commonly termed "garbage collection."

An alternative technique similarly writes the updated pages to a different block than the block containing the original data but eliminates the need to copy the other pages of data into the new block by appropriately marking the data to distinguish the updated data from the superceded data that are identified by the same logical address. This is a subject discussed in afore-mentioned United States published application no. 2002-0099904. Then when the data are read, the updated data read from pages of the new block are combined with the unchanged data read from pages of the original block that remain current, and the invalid superceded data are ignored.

The memory system controller is preferably able, by its structure and controlling firmware, to cause data to be programmed and read under a variety of conditions imposed upon it by the host. At one extreme, audio, video or other streaming data can be received at a high rate of speed, and the memory system is called upon to store the data in real time. At another extreme, the host may cause the memory system to occasionally program one sector of data at a time or to program several single data sectors together that have non-sequential logical addresses. The same data sector can be also be frequently updated. Such single sector programming can occur, for example, when a file allocation table (FAT) stored in the array is being written or updated. The problem presented by such operations on large erase block memories is that frequent garbage collection is required in order to efficiently utilize the storage capacity of the memory. The controller needs to suspend its primary function of transferring data in and out of the memory in order to perform garbage collection, thus adversely affecting system performance.

SUMMARY OF THE INVENTION

Accordingly, at least two different mechanisms are maintained for programming data according to the characteristics of write commands received from a host in order to increase the overall performance of the memory system. In general, the storage of non-sequentially addressed data is treated differently than the storage of sequentially addressed data, in ways that optimize memory system performance with either type of operation.

In an example implementation, a host command to program a single host unit of data (a sector being a common example), a small number of units with sequential logical addresses or units of data with non-sequential logical addresses are handled differently than a host command to program a number of data units that is large, relative to the storage capacity of the individual logical blocks or metablocks, and which have sequential logical addresses. The single, small number of sequential data units or non-sequential data units are written to a first type of designated logical block or metablock while the larger number of sequential data units are written to a second type of designated logical block or metablock. The first type of designated block or metablock (referenced herein as E1) receives updates of data spread over a wide range of logical addresses while the second type of designated block or metablock (referenced herein as E2) receives updates of data stored in a range of logical addresses limited to a single block. Further, if a single or non-sequential data units are more frequently updated than other data units with surrounding logical addresses, the updates may be stored in the first type of designated logical block or metablock that is dedicated to the logical address range of those units (referenced herein as dE1).

A principal result of using these designated blocks is a reduction of the amount of data consolidation that currently becomes necessary when less data that may be stored in a block are updated. The updated data need not be immediately recombined in a single physical block with unchanged data of the same logical block, thus improving system performance. Such a recombination may be postponed until a time when it interferes less with the memory system's acquisition and storage of data. Further, the various designated blocks are preferably dynamically formed to accommodate the programming commands being received, thereby to adapt the memory system for high performance operation in a wide variety of data storage applications.

Additional aspects, features and advantages of the present invention are included in the following description of exemplary embodiments, which description should be read in conjunction with the accompanying drawings. All patents, patent applications, articles publications and other documents referenced herein are hereby incorporated herein by this reference in their entirety for all purposes.

BRIEF DESCRIPTION OF THE DRAWINGS

FIG. 1 is a block diagram of a typical existing flash EEPROM memory device with a memory cell array, control logic, and data and address registers;

FIG. 2 illustrates an architecture utilizing several memory devices of FIG. 1 with a system controller;

FIG. 4 shows an example of one block of FIG. 3 that stores multiple pages 0-15;

FIG. 5 is a representation of a data sector stored in a page of a block of FIGS. 3 and 4;

FIG. 6 illustrates an existing process of updating data in less than all of the pages of a multi-paged block;

FIGS. 7A and 7B are tables of corresponding logical and physical page addresses for the original and new blocks of FIG. 6, respectively;

FIG. 8 illustrates one example of a designation of consolidation blocks E1 and E2 within one plane of the array of FIG. 3;

FIG. 9 provides an example the use of the consolidation block E1 of FIG. 8 to update the data in a few of the pages of another block;

FIG. 10 shows an example of data fields within a data sector stored in a page of FIG. 9;

FIGS. 11A and 11B illustrate one example of sequential operations of consolidating updated data pages of a given data block that uses the block E2 but not the block E1 of FIG. 8;

FIGS. 12A, 12B and 12C illustrate one example of sequential operations of consolidating updated data pages of a given data block that uses both of the blocks E1 and E2 of FIG. 8;

FIGS. 13A, 13B and 13C illustrate another example of sequential operations to update a few pages of data of a given block that uses both of the blocks E1 and E2 of FIG. 8;

FIG. 14 illustrates another example of a designation of consolidation blocks E1 and E2 within a unit of the array of FIG. 3;

FIGS. 15A and 15B illustrate an example of sequential operations to update a few pages of data of a given block that uses both of the consolidation blocks E1 and E2 of FIG. 14;

FIG. 16 illustrates use of blocks E1 and E2 in a type of memory architecture that stores data in metablocks;

FIG. 17 shows a modification of the memory architecture of FIG. 16 with the E1 block being a metablock;

FIG. 18 provides an example of the mapping of logical addresses into a set of E1, dE1 (dedicated E1) and E2 blocks;

FIG. 19 is a flow chart showing operation of the memory system of FIGS. 1-5 in response to host write commands that uses consolation blocks E1, dE1 and E2; and FIG. 20 is a flow chart showing the steps taken in the process of FIG. 18 to allocate any of the E1, dE1 or E2 blocks.

DESCRIPTION OF EXISTING LARGE BLOCK MANAGEMENT TECHNIQUES

Figure 3:
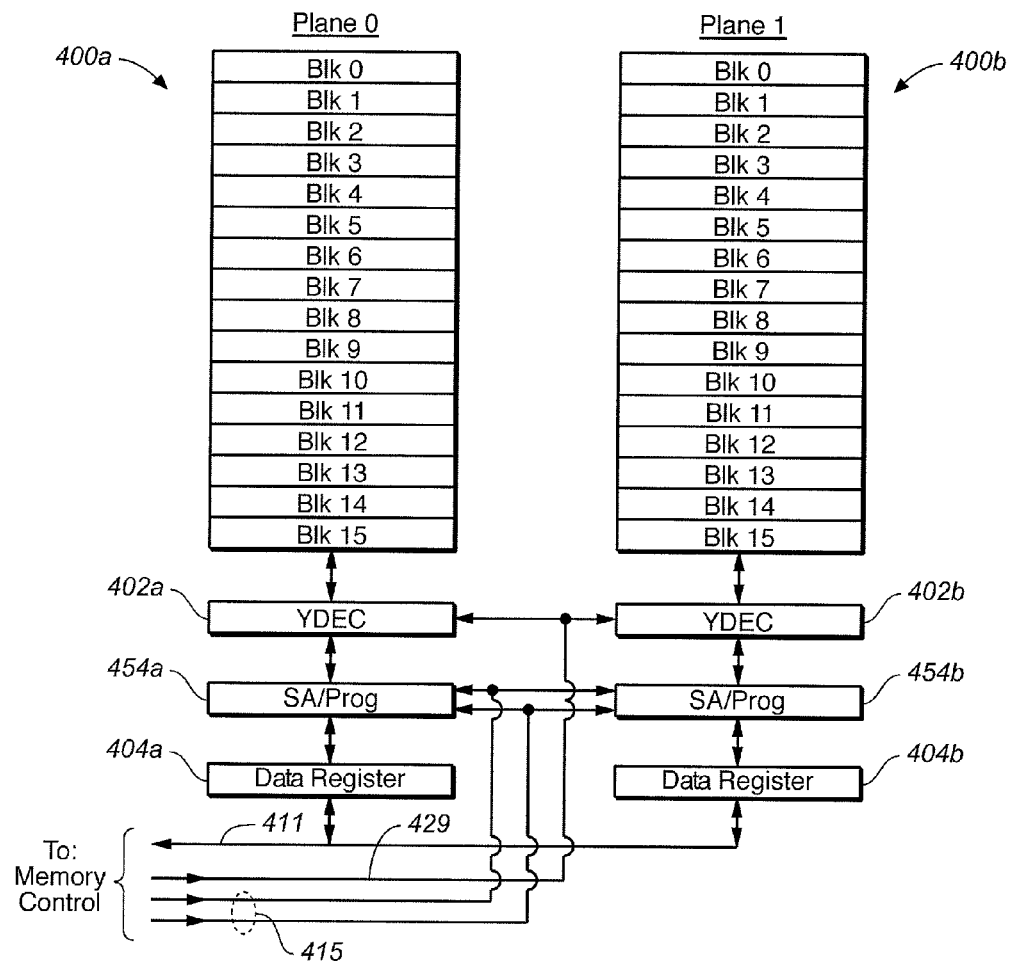
FIG. 3 schematically illustrates an arrangement of blocks in two planes, as an example of the memory array of FIG. 1.

FIG. 1 shows a typical flash memory device internal architecture. The primary features include an input/output (I/O) bus 411 and control signals 412 to interface to an external controller, a memory control circuit 450 to control internal memory operations with registers for command, address and status signals. One or more arrays 400 of flash EEPROM cells are included, each array having its own row decoder (XDEC) 401 and column decoder (YDEC) 402, a group of sense amplifiers and program control circuitry (SA/PROG) 454 and a data register 404. Presently, the memory cells usually include one or more conductive floating gates as storage elements but other long-term electron charge storage elements, including a charge trapping dielectric, may be used instead. The memory cell array may be operated with two levels of charge defined for each storage element to therefore store one bit of data with each element. Alternatively, more than two storage states may be defined for each storage element, in which case more than one bit of data is stored in each storage element.

If desired, a plurality of arrays 400, each with its associated X decoders, Y decoders, program/verified circuitry, data registers, and the like are provided, for example as taught by U.S. Pat. No. 5,890,192, issued Mar. 30, 1999, and assigned to Sandisk Corporation, assignee of the present application, which patent is hereby incorporated herein in its entirety by this reference. Related memory system features are described in patent application Ser. No. 09/505,555, filed Feb. 17, 2000 by Kevin Conley et al., now U.S. Pat. No. 6,426,893, which application is expressly incorporated herein in its entirety by this reference.

The external interface I/O bus 411 and control signals 412 can include the following:
CS—Chip Select. Used to activate flash memory interface.
RS—Read Strobe. Used to indicate the I/O bus is being used to transfer data from the memory array.
WS—Write Strobe. Used to indicate the I/O bus is being used to transfer data to the memory array.
AS—Address Strobe. Indicates that the I/O bus is being used to transfer address information.
AD[7:0]—Address/Data Bus This I/O bus is used to transfer data between controller and the flash memory command, address and data registers of the memory control 450.

This interface is given only as an example as other signal configurations can be used instead that provide the same functionality. FIG. 1 shows only one flash memory array 400 with its related components, but a multiplicity of such arrays can exist on a single flash memory chip that share a common interface and memory control circuitry but have separate XDEC, YDEC, SA/PROG and DATA REG circuitry in order to allow parallel read and program operations among the arrays.

Data is transferred between the memory array via the data register 404 and an external controller via the data registers' coupling to the I/O bus AD[7:0] 411. The data register 404 is also coupled the sense amplifier/programming circuit 454. The number of elements of the data register coupled to each sense amplifier/programming circuit element may depend on the number of bits stored in each storage element of the memory cells In one popular form, flash EEPROM cells each contain one or more floating gates as charge storage elements. Each charge storage element may store a plurality of bits, such as 2 or 4, if the memory cells are operated in a multi-state mode. Alternatively, the memory cells may be operated in a binary mode to store one bit of data per storage element.

The row decoder 401 decodes row addresses for the array 400 in order to select the physical page to be accessed. The row decoder 401 receives row addresses via internal row address lines 419 from the memory control logic 450. A column decoder 402 receives column addresses via internal column address lines 429 from the memory control logic 450.

FIG. 2 shows an architecture of a typical non-volatile data storage system, in this case one employing flash memory cells as the storage media. In one form, this system is encapsulated within a removable card having an electrical connector extending along one side to provide the host interface when inserted into a receptacle of a host. Alternatively, the system of FIG. 2 may be embedded into a host system in the form of a permanently installed embedded circuit or otherwise. The system utilizes a single controller 301 that performs high-level host and memory control functions. The flash memory media is composed of one or more flash memory devices, each such device often formed on its own integrated circuit chip. The system controller and the flash memory are connected by a bus 302 that allows the controller 301 to load command, address, and transfer data to and from the flash memory array. The controller 301 interfaces with a host system (not shown) with which user data is transferred to and from the flash memory array. In the case where the system of FIG. 2 is included in a card, the host interface includes a mating plug and socket assembly (not shown) on the card and host equipment. The controller 301 receives a command from the host to read or write one or more sectors of user data starting at a particular logical address. This address may or may not align with a boundary of a physical block of memory cells.

The flash memory array 400 is usually divided into two or more sub-arrays, herein referenced as planes, two such planes 400a and 400b being illustrated in FIG. 3. A larger number of planes, such as four or eight, may alternatively be included in the memory array 400. Each plane is shown to have 16 physical blocks 0-15, for convenience of illustration, while an actual plane will typically include far more blocks. The block contains the smallest number of memory cells that are erasable at one time, the unit of erase. Each of the planes has its own data registers 404a and 404b, and programming circuits 454a and 454b, respectively. This allows simultaneous programming of data into memory cell blocks of each of the planes 400a and 400b. Each of the planes is operable somewhat independently of the other, as a sub-array.

FIG. 4 shows one of the blocks of FIG. 3 to contain sixteen pages 0-15 of data, for convenience of illustration, since each block likely contains more pages. A page includes the smallest number of memory cells that are programmable together in one programming operation, a programmable unit. Each page in turn stores one or more sectors of data from the host to which some overhead data generated by the memory controller are usually added. An example of a data sector stored in a page is shown in FIG. 5 to contain user data 441 obtained from the host plus overhead data 443 that contains information of the user data 441 and/or of the physical block in which the data sector is stored. The amount of user data 441 in a sector can conveniently be 512 bytes of data. This unit of storage is particularly useful when the memory system is used with a host that transfers data to and from the memory in units of data sectors, which includes most personal computers. The overhead data may be in the order of 16 bytes for each 512 bytes of user data.

If the memory system is operated with binary states, where one bit of data is stored in each memory cell storage element, one sector of user data plus overhead data occupies 528 memory cells. If the memory cells are operated in four states, thus storing two bits of data per cell, only one-half as many cells are required to store a single data sector, or the same number of cells can store two data sectors such as where each cell stores one bit from each of two data sectors. Operation with a higher number of states per storage element further increases the data storage density of an array.

In some prior art systems having large capacity memory cell blocks that are divided into multiple pages, as discussed above, data of pages in a block that are not being updated need to be copied from the original block to a new block that also contains the new, updated data that has been written by the host. This technique is illustrated in FIG. 6, wherein two of the blocks of one of the planes of FIG. 3 are shown, blocks 3 and 13 of plane 0, for example. Data within pages 7-10 of the original block 3 are being updated by the four pages of updated data shown. The new data is written into the corresponding pages 7-10 of an unused erased block 13. Unchanged user data from pages 0-6 and 11-15 in the original block 13 are then copied into corresponding pages of the new block 13. All pages of the new block 13 are preferably programmed in a single sequence of programming operations. After the block 13 is fully programmed, the original block 3 is erased and placed into an erased block pool for later use. The copying of data between the blocks 3 and 13, which involves reading the data from one or more pages in the original block and subsequently programming the same data to pages in a newly assigned block, adversely affects the write performance and usable lifetime of the memory array.

With reference to FIGS. 7A and 7B, partial tables show mapping of the logical blocks into the original and new physical blocks 3 and 13 before (FIG. 7A) and after (FIG. 7B) the updating of data just described with respect to FIG. 6. Before the data update, the original block 3, in this example, stores pages 0-15 of LBN3 in corresponding pages 0-15 of PBN3. After the data update according to FIG. 6, the new block 13 stores pages 0-15 of LBN3 in respective pages 0-15 of PBN13. The address translation table is shown in FIG. 7B to have been updated in this manner. Receipt of a request from the host to read data from LBN3 is then directed to the physical block 13 (PBN13) instead of the original physical block 3 (PBN3).

The LBN of the data in each page may be stored as overhead data in that page, as done in some commercial flash memory products. The controller then builds a table in the form of that shown in FIGS. 7A and 7B from the LBN fields read from the physical pages and the PBNs of those pages. The table may be stored in a volatile memory of the controller for ease of access, although only a portion of a complete table for the entire system need be stored at any one time. A portion of the table may be formed immediately in advance of a read or programming operation that involves the blocks included in the table portion.

In other prior art systems that operate differently than described with respect to FIG. 6, an old/new flag is included as overhead stored with the user data in each of the pages in order to distinguish the pages containing the new data from the pages containing the superceded data. Only the new data are written to the newly assigned block. The data in pages of the original block not being updated need not be copied into the new block. Data of one logical block is then split between two physical blocks and is duplicated in part. This requires that more memory blocks be made available for a system having a given memory capacity. It also requires use of a memory that allows writing a flag to the old pages without first having to having to erase those pages.

Various flags are typically stored as overhead in the same physical page as the other associated overhead data, such as the LBN and an ECC field. Thus, to program the old/new flags in pages where the data has been superceded requires that a page support multiple programming cycles. That is, the memory array must have the capability for its individual pages to be programmed in at least two stages between erasures. Furthermore, the block must support the ability to program a page when other pages in the block with higher offsets or addresses have been already programmed. A limitation of some flash memories, however, prevents the usage of such flags by specifying that the pages in a block can only be programmed in a physically sequential manner. Furthermore, in such flash memories, the pages support a finite number of program cycles and in some cases additional programming of programmed pages is not permitted. There are many different types of flash EEPROM, each of which presents its own limitations that must be worked around to operate a high performance memory system formed on a small amount of integrated circuit area.

What is needed is a mechanism of optimally managing data based on host usage data patterns.

DESCRIPTION OF EXEMPLARY EMBODIMENTS OF THE INVENTION

The trend in the development of flash EEPROM systems is to increase significantly the number of memory cells, and thus the amount of data stored, in the individual blocks in order to reduce the cost of manufacturing the integrated memory circuit chips. A block size of something like 512 or 1024 sectors of data (528 bytes each) is contemplated, thus having an individual capacity of 270,336 or 540,672 bytes of user and overhead data. If only one sector is included in a page, then there are the same number of pages but the trend is also to increase the amount of data that is programmed as part of one programming operation by including two, or perhaps more, data sectors in each page, in which case the number of pages in a block that stores a given number of sectors of data is reduced. But regardless of the details of any particular implementation, the existing techniques described above for updating only a portion of the data in a block increases the adverse effect on memory performance and/or capacity utilization as the data storage capacity of the individual block increases.

It can be seen that if the data in only a few of the 528 or so pages of a block are being updated, the existing technique described with respect to FIG. 6 will have a significant increased overhead in terms of the amount of time required to copy the remaining unchanged pages, usually one page at a time, from the old to the new block. Although this can be a problem with much smaller block sizes now in use in real time data storage applications, it becomes worse as the size of the blocks increases. And if the alternate technique of tagging the old data pages in the original block is used, the few pages of updated data are written into another large block with the likelihood that the remaining pages in the new block remain unused.

Therefore, according to one aspect of the present invention, at least one block is provided in each plane of the memory for receiving such small amounts of updates to the data of some or all of the other blocks in the plane. In a memory plane illustrated in FIG. 8, one type of block 10 is so designated, identified herein as an E1 block. There is also at least one type of block (referred to as an E2 block) designated for each memory plane that operates differently, as described later. Any of unused blocks in the plane may be designated as E1 or E2 blocks, and this designation can be changed from time to time during operation of the memory. The designation of E1 and E2 blocks is dependent on the programming patterns of the host.

With reference to FIG. 9, use of the E1 block is described. In this example, data in pages 7-10 of block 3 are being updated, as in the example previously described with respect to FIG. 6. But instead of writing the updated data to the same range of pages within a new block, they are written in the E1 block in any convenient unused erased pages, usually the next in order. In FIG. 9, the E1 block is shown to be storing, in its pages 0-2, updated data from three pages of logical block 7, and, in its pages 3 and 4, updated data from logical block 2. The most convenient place to store the current pages 7-10 of updated data from logical block 3 is in the next pages 5-8, respectively, the next four pages in order. The remaining erased pages 9-15 of the E1 block are available to store updated data from pages of other blocks.

At the time of storing the updated data, the original data in pages 7-10 of block 3 become obsolete, in this example. When reading the data of block 3, therefore, the memory system controller needs to also identify the updated pages 7-10 from the E1 block and use their data in place of that of pages 7-10 in the original block. An address map is maintained in a fast volatile memory of the controller for this purpose. Data for the address map are obtained upon initialization of the system from the overhead data of the pages in at least a portion of the system or other stored data in the non-volatile memory, including data in the E1 block. This data include the LBN of each page that is commonly included as part of the overhead data of each page. Since the pages are not constrained to be written in any particular order in the E1 block, the overhead of each data page also preferably includes its logical page offset within the block. The data of the address map are then updated from the overhead fields of any data pages that are changed in the E1 block.

It has been assumed so far that there is only one update of any given page in the E1 block. This may be the case in some applications but not in others. In the example of FIG. 9, for example, page 8 of the original block 3 could be updated a second time, and this second update is also stored in the same E1 block, in another of the available erased pages. When reading the data stored in block 3, the controller also reads data from the headers (overhead data) of the pages within the E1 block, either from a table maintained in controller memory or from the pages themselves. The headers of the programmed pages within the E1 block are read in the same direction each time, such as from its highest programmed page 8 to page 0, in the example of FIG. 9. In the case of duplicate updated pages being encountered in the type of memory where pages are written in sequence, the controller knows that the first to be read in reverse sequence is the most current and subsequently ignores all other pages in the E1 block that have the same LBN and page offsets. The headers of the pages within the E1 block can also be read during initialization of the memory to maintain a complete map.

As a more general, alternate way to identify the most current of two pages having the same LBN and page offset, the overhead of each page may additionally contain an indication of its time of programming, at least relative to the time that other pages with the same logical address are programmed. This allows the controller to determine, when reading data from a particular block of the memory, the relative ages of the pages of data that are assigned the same logical address. This technique allows the updated pages to be written into the E1 block in any order, in a memory system that allows this. It can also make it easier to operate a memory system with more than one E1 block in a single plane. This way of distinguishing old from current data is described more fully in aforementioned United States patent application publication no. 2002-0099904.

There are several ways in which the time stamp may be recorded in the individual pages. The most straightforward way is to record, when the data of its associated page is programmed, the output of a real-time clock in the system. Later programmed pages with the same logical address then have a later time recorded. But when such a real-time clock is not available in the system, other techniques can be used. One specific technique is to store the output of a modulo-N counter as the time stamp. The range of the counter should be one more than the number of pages that are contemplated to be stored with the same logical page number. When updating the data of a particular page in the original block 3 of FIG. 9, for example, the controller first reads the count stored in the overhead of the page whose data are being updated, increments the count by some amount, such as one, and then writes that incremented count in the new updated page being stored in the E1 block. If this count is included in a table maintained in a controller memory, the controller reads it from that table. Otherwise, the controller reads the count from the header of the page being updated. The counter, upon reaching a count of N, rolls over to 0. The number of blocks with the same LBN is made to be less than N in order to insure that there is a point of discontinuity in the values of stored counts. This allows the system counter to detect the case in which a LBN with a low count value is more recent than a LBN with a higher count value.

The controller, when called upon to read the data, easily distinguishes between the new and superceded pages' data by comparing the time stamp counts in the overhead of pages having the same LBA and page offset. In response to a need to read the most recent version of a data file, data from the identified new pages are then assembled, along with original pages that have not been updated, into the most recent version of the data file.

An example of the structure of a single sector of data stored in the individual pages of FIG. 9 is shown in FIG. 10. The largest part is user data 45. An error correction code (ECC) 47 calculated from the user data is also stored in the page. Overhead data 49, including a field 41 storing the LBN and page tag (logical page offset), the time stamp 43 and an ECC 50 optionally calculated from the overhead data are also stored in the page. By having an ECC 50 covering the overhead data that is separate from the user data ECC 47, the overhead 49 may be read separately from the user data and evaluated as valid without the need to transfer all of the data stored in the page. Alternatively, however, where the separate reading of the overhead data 49 is not a frequent event, all of the data in the page may be covered by a single ECC in order to reduce the total number of bits of ECC in a page. As an alternative to using an ECC, other known redundancy techniques can be employed instead. Additional description of techniques to keep track of multiple versions of the same data page is contained aforementioned United States patent application publication no. 2002-0099904.

The E1 block is used for updates when the number of pages being updated, for example, by a single host command is small in comparison with the total number of pages in the individual block. When a sufficiently large proportion of the pages of a block are being updated, it is then more efficient to use the existing technique instead, described with respect to FIG. 6, wherein the updated and unchanged pages are written directly to a new block with their original page order being maintained. One process or the other is chosen by the controller, depending upon the proportion and/or absolute number of pages of a block being updated at one time, and perhaps other factors of the operation of the memory at the time the update is taking place. One such other factor may be when it is inconvenient to consolidate pages in the new block 13, which may be designated as the E2 block, in which case the updated data are temporarily stored in the block E1.

The optimum proportion or number of updated pages that serves as a decision criterion between invoking the two updating techniques may differ between memory systems that are constructed and/or operated in different ways. But having a fixed criterion is the most convenient to implement. For example, if the number of pages being updated is less than 50 percent of the total number of pages in the block but at least one page is being updated, the new technique of FIG. 9 is used. If that proportion is equal to or greater than 50 percent but at least one page is not being updated, the existing technique of FIG. 6, or something similar, is used. The decision number may be, for instance, as high as 75 percent in some systems, or as low as 25 percent in others. The criteria for choosing the decision number, for example, can be that which optimizes the performance (such as the speed of handling programming operations) of the memory system. The number can be stored as a system parameter in order that it may be modified during product configuration for system optimization. An algorithm can also be included in the controller operation to update and optimize the decision number based on a history of a current host operations including garbage collection activity.

Once a decision is made by the controller to direct incoming data to the E1 block, the nature of the programming operation may be detected, after writing one or more pages into the E1 block, to be better directed to the E2 block. An example situation is when sequential write commands are discovered to be writing sequential pages in a single block, one or a few pages at a time. This can be noted by the controller after a few such pages are written into the E1 block, after which further writes to the E1 block are stopped and the remaining sequential writes are directed instead to the E2 block. Those pages already written to the E1 block are then transferred to the E2 block. This procedure reduces the likelihood of having to consolidate the pages of the block E1 as a result of this programming operation. Alternatively, in a case where the sequential page writes begin in an erased E1 block, that block may be converted to an E2 block.

FIG. 11A shows the use of the E2 block 13 (FIG. 8) when the number of pages being updated is higher than the predetermined decision level. In this situation, the E1 block 10 is not used. Rather, the updated data sectors of pages P2-P11 stored in an original block 3, as an example, are written directly into the same pages P1-P11 of the E2 block 13, which block has been previously erased. The data sectors of the remaining pages P1, P2 and P12-P15 of the original block 3 that are not being changed are then copied into the E2 block 13 in the same pages numbers. In most cases, where more than one data sector is stored in a page, all the data sectors of a page are preferably simultaneously copied. A next step, as indicated by FIG. 11B, is to erase the original block 3 and designate it as the new E2 block for future operations. The translation table of the type illustrated in FIGS. 7A and 7B is updated to show the changed PBN for the same LBN.

As described above, updated pages of data of one block are preferably stored in pages of the E2 block having the same offsets as in the original block. As an alternative that is suitable for some applications, however, the system controller can store pages in the E2 block without regard for their offsets within the original block. The pages can, in this alternative, be stored in order beginning with page P0 of the E2 block. This adopts one characteristic of the E1 block that is different from the usual blocks but will still not allow more than one copy of any page of data to be stored in the E2 block. When this alternative type of E2 block is used, data consolidation may be more complex since the out of order pages in the E2 block will be transferred into pages of another block having the page offsets of their original block, in order to combine these updated pages with unchanged pages of the original block.

In order to be able to limit the number of blocks in a system that are set aside to serve as E1 blocks, it is desirable that they be used efficiently so that there are an adequate number of erased E1 block pages available to satisfy an expected demand for small partial block updates. Therefore, an intermittent consolidation takes place of pages of data of a logical block that are stored in a primary physical block and the E1 block. This removes at least some of the updated data pages from the E1 block that belong to that logical block, thus making these pages available for future use. They are consolidated into a single physical block.

An example of such an erase consolidation operation (garbage collection) is given in time sequential block diagrams of FIGS. 12A, 12B and 12C. In each of these figures, the top diagram represents the use of the pages of block 3 of the memory array plane of FIG. 8, which initially (FIG. 12A) is the primary block storing data of a particular logical block. Data from pages P7-P10 of block 3 have been updated, however, and those pages of data have been stored in pages P5-P10 of the designated E1 block 10 (middle diagram of FIG. 12A). The remaining pages P0-P6 and P11-P15 of block 3 contain valid data. Other pages P0-P4 of the E1 block 10 contain updated data from a block other than block 3 of FIG. 8.

As a first step in an erase consolidation operation to free up some of the pages of the E1 block, data from the four pages P5-P8 of block 10 are copied into pages P7-P10 of the designated E2 block 13 (bottom diagram of FIG. 12A). Block 13 has earlier been erased. These data are now stored in the pages of block 13 that have the same address offsets as they originally did in block 3 before their data were updated. A next step is to then copy the valid data pages P0-P6 and P11-P15 from block 3 into pages of the E2 block 13, as shown by FIG. 12B. Block 13 then contains all the pages of data from the original block 3, with data in its pages P6-P10 being updated, in the single physical block 13. Block 3 is then (FIG. 12B) erased and designated as the new E2 block for the memory plane of FIG. 8. Many of these steps may be executed in parallel.

Although the data in pages P5-P8 of the E1 block 10 are no longer necessary (FIG. 12B), the data in pages P0-P4 of the E1 block are still valid, being updated data of pages of another physical block. Those data are then copied into pages P0-P4 of the erased block 3, as shown in FIG. 12C. Block 3 is then re-designated by the controller as the E1 block, leaving the erased pages P5-P15 for future use to temporarily store pages of updated data in the same manner as described above. Block 10 is then erased and designated by the controller as the E2 block. The old, superceded pages of data have all been deleted as part of the process.

There are several triggering events that can be used by the memory system controller to initiate the erase consolidation operation described above with respect to FIGS. 12A-12C. The most common event is when the block that is designated as the E1 block at the moment has a certain proportion of its pages full of updated data. A certain number of erased pages need to be kept available in the E1 block, that number depending upon a number of factors such as the number of blocks using each E1 block for updates. It is most beneficial to the E1 block to consolidate the block that has the most obsolete data pages in the E1 block. A single erase consolidation operation then clears the largest number of unnecessary pages from the E1 block. There are other criteria that may also be used to choose the block having data pages in block E1 that is to be consolidated, such as the detection of an error in the data of such a block's data page(s) in the block E1. This minimizes the chance that the occurrence of any subsequent error in the block E1 page(s) will swamp its ECC.

Another event that can be used to trigger the erase consolidation of FIGS. 12A-12C can be when performance of the memory becomes degraded due to insufficient space in the designated E1 block. When a certain number of pages of a block are being updated and there are too few erased pages in the E1 block to store the number of pages being updated, the controller preferably writes the updated pages into the E2 or other erased block with the same page offsets as the original data pages being updated. This necessarily occurs even though the number of pages being updated is less than the predetermined number that would normally call for use of the E1 block. The valid or non-obsolete data pages are then copied from the original block into the same E2 or other erased block, to combine all the current data for a logical block into a single physical block. This will take more time, and thus adversely affect system performance, than if the designated E1 block can be used. Therefore, after this is detected to have happened a predetermined number of times, the consolidation operation of FIGS. 12A-12C is performed in order to free up more pages in the E1 block. Otherwise, the full advantage of having and using the E1 block are lost. The predetermined number of times may be a pre-set parameter or may be adaptively optimized by the memory controller.

Also, when a block of data having updated data pages in the E1 block needs to be refreshed, if this data refresh is part of the memory's operation, its refreshing can include the erase consolidation operation of FIGS. 12A-12C. It can be included as part of other overhead operations as well, since it is often efficient to do so at that time. Further, as another triggering event, the erase consolidation can be done when the controller is not otherwise occupied or scheduled to be occupied for a time sufficient to perform the consolidation operation. Any one, several or all of the factors discussed above may be used to initiate the erase consolidation operation of FIGS. 12A-12C. In addition, although the erase consolidation operation has been described to consolidate data pages for a single block, the process can be repeated for two or more blocks in order to free up even more pages in the E1 block. Also, the data pages can be consolidated with those of a metablock. This is conveniently done when the controller is not to be called upon to perform other functions for a time sufficient to do multiple erase consolidation operations involving the E1 block.

The consolidation operation described with respect to FIGS. 12A-12C uses available erased pages in the E1 block because the number of pages being updated at one time is less than a pre-set number, such as one-half the number of pages in the E1 block, one of the criteria that may be set for using the block E1. If more than those number of pages are being updated, the updated data are written directly into the E2 block, as previously described with respect to FIGS. 11A-11B. A different consolidation operation occurs when the number of pages of a logical block that are being updated at one time exceeds the predetermined number, and no other established criteria for using the block E1 exist, but where one or more updated pages of that logical block have previously been written into the E1 block. In this case, the updated blocks are written directly into the E2 block. An operation of the memory system controller that handles this situation is described with respect to FIGS. 13A-13C.

In the example of FIG. 13A, pages P2-P11 of the data stored in block 3 (top diagram) are being updated at one time. Data pages P12-P13 have previously been updated, the updated data being stored in pages P5-P6 of the designated E1 block 10 (middle diagram of FIG. 13A) of the memory plane of FIG. 8. As a first step in updating data pages P2-P11, the updated data is written directly into corresponding pages P2-P11 of the designated E2 block 13 (bottom diagram of FIG. 13A). The previously updated pages P12-P13 are also copied into pages P12-P13 of the E2 block from their location in pages P5-P6 of the E1 block.

A next step, illustrated in FIG. 13B, causes the unchanged data in pages P1-P2 and P14-P15 of block 3 to be copied into corresponding page locations of block 13. Block 13 then stores all pages of the current updated data. Block 3 is then erased and designated as the E2 block. Remaining updated data from some block other than block 13, which is stored in valid data pages P1-P5 of the E1 block 10, are then copied into corresponding pages of block 3, as indicated by FIG. 13C. Block 3 is then designated as the E1 block. Block 10 is then erased and becomes the E2 block for any future operations that need to use it. All of the old, superceded pages of data have been deleted in the process.

The erase consolidation operation illustrated by FIGS. 13A-13C is preferably initiated in response to updated data pages being written to the E2 block (FIG. 13A). That response can be immediate, in order to free up an E2 block right away for future use within the memory plane, or, alternatively, the consolidation can be initiated after some delay. A delay allowing one or a few further programming cycles to take place after writing the updated data pages in the E2 block allows any further updates to the data of the logical block initially stored in physical block 3 to be included in the consolidation operation. This saves having to perform such consolidation twice in close succession for the same data block.

The erase consolidation operations involving the E1 block, as described with respect to FIGS. 12A-12C and 13A-13C, have general application to memory systems used with personal computers, computer servers, personal digital assistants, sound and video processing devices, and the like. In many of these applications, one or just a few data pages of one or just a few blocks of the memory are updated at one time at frequent intervals. An example is the maintenance of a file allocation table (FAT), a common component of many computer systems. The FAT is often stored in only one or a few blocks of a single plane of the memory. At least one page storing a portion of the FAT table is usually updated each time data is written by the host to the memory, and as part of each erase consolidation operation, and whenever else the allocation of host designated logical blocks to physical memory blocks designated by the controller is changed. Another example of frequent data updates is for overhead data maintained as part of the memory operation. For example, certain information about the usage or characteristics of each memory block is kept together in another block. This data is updated nearly continuously as the memory is used.

For systems where such frequent updates of significant amounts of data take place, a small amount at a time, the performance of the memory system is improved by designating more than one E1 block for a region of the memory that is subjected to these frequent updates. For a range of LBAs to which the host stores primarily or only such frequently updated data, an E1 block or metablock can even be dedicated for use with only that block. This is done when a resulting improved performance is worth the cost of having to remove one or more additional blocks from general service in order to serve as additional or dedicated E1 (dE1) blocks. This is often the case for blocks storing FAT tables, block overhead data, and the like. The designation of additional or dedicated E1 blocks can result in a substantial reduction in the frequency at which the erase consolidation operation of FIGS. 12A-12C must be performed.

FIG. 14 illustrates an allocation of blocks in one memory plane at one instant in time that is different than that of FIG. 8. In addition to block 10 being designated by the memory controller as a general E1 block for the memory plane, block 2 is designated as a dE1 block for updates only from block 1. Whenever data of a page of the LBN mapped to block 1 is updated and a condition for writing to the block E1 exists (rather than to the block E2), the updated data page is written into an available erased page of the dE1 block 2. The page within the within the dE1 block 2 that receives the updated data will be the next page in order in a memory of the type requiring that pages be written into its individual blocks in such a sequence. Similarly, the block 4 is designated as a dE1 block dedicated to receive updated data of a LBN mapped to block 3, and block 6 is a dE1 block dedicated to the LBNs of block 5. The use of three dedicated E1 blocks within a plane is only one specific example of the principle being described. Only one dE1 block may be provided in some applications, or up to one-half of the blocks in a plane may be so designated. Block 13 is designated as the E2 block for the example plane of FIG. 14.

The continued use of a dedicated E1 block will, of course, cause it to eventually become full. Certain pages of the data block to which an E1 block is dedicated can be rewritten multiple times before the E1 block becomes full. Each page is written into the next available erased page of the E1 block, in this example, and its page offset within the original data block stored as part of the overhead data for the block. Shortly before or at the time that any dedicated E1 block becomes full, a consolidation operation takes place to rewrite the data block to include the most current pages from its E1 block and any unchanged data pages. An example of this is given in FIGS. 15A and 15B.

In FIG. 15A, the consolidation of data pages from block 3 and its E1 block 4, of FIG. 14, into the E2 block 13 is illustrated. In this example, the data of pages P0-P1, P5-P9 and P13-P14 is unchanged. The remaining pages P2-P4 and P10-P12 and P15 have been updated, in this example, with the most recent updated pages being stored in the dE1 block 4 at respective pages P7, P2, P11, P13, P10, P8 and P12. The consolidation process has been begun, in this illustrative example, because all of the dE1 block 4 pages have been programmed except the highest two pages P14 and P15; the dE1 block has almost run out of space. The unchanged pages in original data block 3 and the most recent updated pages in dE1 block 4 are then assembled by a programming operation into the E2 block 13. Each such page is written into an E2 block page having the physical offset of the page. That is, although the updated pages are temporarily stored in the dE1 block in the order they are updated, rather than in their respective physical page locations, the most recent updates of pages from the original data block 3 are copied into the pages of the E2 block 13 having locations corresponding to their addressed offsets. As shown in FIG. 15B, the blocks 3 and 4 are then erased, one being designated as the E1 block dedicated to the new data block 13 and the other becoming the E2 block for the memory plane.

However, it is not required that the data pages in the E2 block 13 have the same address offsets as the pages that are updated or copied. It is sufficient that they remain in the same relative order. For example, the first data page P0 may be stored in the E2 block 13 of FIG. 15A in third physical page from the left instead of the left most physical page. The remaining data pages are then positioned in order of their logical addresses within the block 13, wrapping around with the last pages P14 and P15 stored in the left most two pages of the E2 block 13. When such page shifting is utilized, the page tag 41 (FIG. 10) of the user data overhead can be used to keep track of the offset of the data pages within the E2 block.

The designation and use of the additional E1 blocks in the memory plane of FIG. 14 may be programmed into the memory system controller firmware to occur when it is desirable to have additional E1 blocks dedicated to operate with a plurality but less than all the LBNs mapped into the plane. The LBNs chosen to have individual associated E1 blocks are those to which the host is expected to frequently update its data. Alternatively, the controller firmware can dynamically designate dE1 blocks that are each associated with only one other LBN in response to the way that the memory is actually used. For instance, when data is being written to an LBN by the host in only one or a smaller than normal number of sectors per host command, that LBN may be assigned its own dE1 block. Additionally, a dE1 block may be assigned to those LBNs where the data is continuously being overwritten. The use of dE1 blocks reduces the frequent consolidation of data pages out of the general plane block E1.

As another example of when the need for a dE1 block exists, a much higher use of the consolidation process of FIGS. 12A-12C by a particular block of data than by other blocks can cause an unused block of the plane to be designated as an E1 block dedicated to operate with the LBN of the frequently updated data. In order to optimize performance, it is preferable to dedicate a block dE1 to the block being frequently consolidated. An example of a process for the controller firmware to determine when an E1 block should be dedicated to a given LBN as a dE1 block is to maintain counts of (1) the number of host commands for writing to the given block which cause a write to the E1 block, (2) the total number of writing operations to the given block and/or (3) the number of sectors with the same logical address that are written to the E1 block. When the ratio of these counts exceeds a predetermined value, then the dedicated block dE1 is established. The consolidation operation of FIGS. 15A and 15B then keeps the E1 block associated with each logical block containing such data.

As another example of dynamically establishing dE1 blocks, the memory controller can be programmed to distinguish frequently updated types of data from less frequently updated types of data, and direct such data to the appropriate blocks. For example, the memory controller can recognize when a single sector of data is being sent by the host with individual commands, typical of entries for a FAT table that are frequently updated, as compared with the host sending multiple sectors of data with a single command, typical of user data that is not so frequently updated. When single sectors of data are received, they are then mapped to the physical block(s) to which a dE1 block is dedicated. When multiple sectors of data are received by the memory system as a unit, they are sent to data blocks that share an E1 block with other data blocks. This non-dedicated E1 block contains data from multiple LBNs.

The techniques of the present invention may also be applied to memory architectures having one or multiple planes that are logically divided into zones but the use of zones is not necessary for implementing the present invention. In the case of multiple planes, the individual zones extend across the planes. Metablocks may or may not be used. An example of a memory system defining logical zones across multiple planes is schematically shown in FIG. 16. Four planes 0-3 are shown, although fewer or more planes may be included in the memory system. Each plane contains a large number of blocks, a portion of which is indicated by the rectangles in FIG. 16. Each block includes a number of pages of data, as indicated for one of the blocks 61, as described above for the other memory systems. A difference here is that the planes are further divided into zones, where each zone includes a given number of blocks from each of two or more of the planes. For example, with reference to FIG. 16, zone 0 includes a number of blocks from each of planes 0-4, zone 1 another group of blocks from each of the planes, and so on. The blocks in each plane within a zone usually occupy the same contiguous set of physical block addresses but this is not required. A distinct range of host logical addresses is mapped into each zone.

The unit of operation of the memory system of FIG. 16 is preferably a metablock. A metablock includes, in this example, one block from each plane that are logically connected together to form the metablock. In this case, each metablock is formed within a single zone. One metablock is shown in FIG. 16, within zone 1, formed of blocks 63, 64, 65 and 66, as an example. Characteristic operations of a metablock include simultaneous erasure of all the blocks within the metablock, and simultaneous programming and reading of one or more pages from each block of the metablock. This increased parallelism significantly increases the performance of the memory system. The identity of the individual blocks within the various metablocks can be maintained as a fixed or dynamic linked list, array table and the like, in any convenient location within the system. Usually, overhead data stored along with user data of each page will include an address, logical and/or physical, sufficient to identify the plane, zone and block in which the page resides, as well as an offset of the page within that block. An address map is then created within a memory of the controller by the controller reading these address fields of the page overhead data. This is usually done for part of the memory at a time, preceding a programming, reading or erasing operation directed to that part of the memory. In the case of a system that is not divided into zones, individual metablocks can be formed from blocks throughout the entire available physical address space of the multiple planes.

One or more blocks within each zone can be allocated for use as the block(s) E1 and block(s) E2 for the other blocks in the zone. In the example illustrated in FIG. 16, zone 1 is provided with one block E1. The writing of a partial block of data to any of the metablocks within zone 1 will then be directed to the block 69 when that write operation satisfies the criteria for use of the block E1. More than one block E1 will usually be required for each zone, depending upon the size of the zone. Indeed, one or more metablocks can be allocated in each zone for the E1 function, as illustrated in FIG. 17, where blocks E1*a*, E1*b*, E1*c* and E1*d*, one from each of the planes 0-3, form a metablock within zone 1. In either of the cases of FIG. 16 or 17, one or more metablocks E2 are allocated for each zone. Alternatively, a pool of metablocks can be provided somewhere in the system to serve the E1 and E2 block functions for all zones, such as by grouping them in a single zone. A metablock E1 can also be dedicated to a single other metablock that is receiving frequent writes. Indeed, the above description for a single block E1, such as the consolidation of FIGS. 12 and 13, can alternatively be implemented with a metablock E1. The size of the block unit does not alter the basic processes. The use of metablocks for E2s is usually preferred to a single block but the use of single blocks for E1s may be preferred to metablocks for efficiency. It should also be noted that the description involving the use of metablocks in a single zone of a multiple zone array also applies when the entire array includes only one zone.

In a typical allocation of physical blocks E1, dE1 and E2 for receiving updated data pages within discrete ranges of logical block addresses, a number of such blocks are allocated for use with each of two or more non-overlapping sets of contiguous logical block addresses, such as typically occurs when the system has its blocks or metablocks organized into the zones described above. The same rules are then most conveniently applied with each set of logical block addresses as to when and how their allocated E1, dE1 and E2 blocks or metablocks are used.

However, the use of any or all of the physical E1, dE1 and E2 blocks need not follow such constraints. For example, the rules of when and how these special blocks are used can be different for one range of logical block addresses than for another range. This allows recognition of different typical host usage patterns or types of data that are stored in different ranges of host logical addresses. Further, the range of logical block addresses to which a particular set of E1, dE1 and E2 blocks is dedicated need not be entirely contiguous. One range of logical block addresses can even be made to overlap with another range, with the rules for using the E1, dE1 and E2 blocks dedicated to each overlapping range being different. In this latter case, programming by the host of data with logical block addresses within the overlapping ranges are eligible for storage in one of two or more sets of physical E1, dE1 or E2 blocks, depending upon which set of rules is satisfied by the host operation. Preferably, the rules are set so that any one programming operation in an overlapping logical address range is eligible for storage in only one of the possible sets of E1, dE1 or E2 blocks.

FIG. 18 shows an example assignment of physical E1, dE1 and E2 blocks to logical block addresses. Among the four logical blocks LBN{x} through LBN{x+3} having sequential logical addresses that are illustrated, LBN{x}, LNB{x+1} and LBN{x+2} share a common E1 block for storing updated data satisfying the criteria for use of an E1 block while they are each mapped into separate E2 blocks for storing updated data satisfying the criteria for use of an E2 block. The ranges of logical block addresses designated to use specific E1 and E2 blocks may be the same, different with some overlap or mutually exclusive. The memory may then adapt to host usage. For example, in the case of logical address ranges receiving frequent single data sector updates, they can be mapped to E1 or dE1 blocks but not an E2 block since the update of enough data at one time to make an E2 block useful is unlikely.

Data stored in an E2 block, when a portion is further updated, are stored in an E1 block designated for the same data logical addresses. Of course, updated data having logical addresses designated for an E2 block can be stored in an E1 block without first having to store data of that logical address within the E2 block. The selection of the E1 or E2 block for storing updated data is dependent upon the criteria discussed above.

The flowchart of FIG. 19 shows an exemplary operation of a flash memory system that utilizes the blocks E1, dE1 and E2 discussed above in a manner that dynamically responds to patterns of host operation to optimize performance of the memory system. The process begins each time the memory system receives a write command from the host system to which it is connected, as indicated at 101. The write command includes the LBN of the data, the number of sectors of data to be written, and the like. The LBN will cause the data to be mapped into a block of a memory plane or into a metablock extending across multiple planes, depending upon the structure and operation of the particular memory array being programmed. A first step 103 checks whether an existing E2 block or metablock associated with the received LBN has room for the number of data sectors being programmed. If so, a next step 105 determines whether the data sectors of the current write operation are a continuation of a previous write operation with sequential addresses. If so, the data are programmed into the existing E2 block, as indicated by a step 107.

But if it is determined in the step 105 that the new write is not of sectors that are a continuation of a previous sequence of sectors, it is then determined in a step 109 whether the gap of logical sector addresses involves a small number of sectors, such as one or just a few. If less than some preset number of sectors, then these unchanged data sectors are copied into the E2 block in order, as indicated by a step 111, and the new data sectors are written to the E2 block per the step 107. This copying of a few sectors of unchanged data into the existing E2 block may be optimal rather than treat the subsequent write as totally disconnected from the prior write because of a gap of a small number of sectors.

But if the logical address gap is larger than the preset number of sectors, then a next step 113 considers whether a new E2 block should be created for an LBN range that includes the pending write operation. The statistics considered can include an analysis of stored or recent write transactions, or may be as simple as determining whether the number of sectors of the current write operation is greater or not than a fixed or dynamically determined threshold number. This threshold number may be, for example, less than the number of data sectors stored in a block but more than one-half or three-quarters of a block's capacity. If it is determined from the defined statistics to create a new E2 block, this is done in a step 115 and the data of the pending write are then programmed into the new E2 block in the step 107. The process for allocating a new E2 block is explained below with respect to the flowchart of FIG. 20.

This discussion is based upon the determination being made in the step 103 that there is room in an existing E2 block for the number of data sectors of the pending write operation. If there is not enough room, however, the processing jumps to the step 113 to determine whether a new E2 block should be created.

If it is determined in the step 113 that a new E2 block should not be created for the data of the pending write operation, it may likely be because the number of sectors is less than (or equal to) the preset threshold number used in the step 113 and thus more appropriately written to an E1 block. In a next step 117, therefore, it is determined whether an existing dE1 block exists for an LBA range in which the current data sectors reside. If so, these data sectors are programmed into that dE1 block, in a step 119. But if not, it is then determined in a step 121 whether a new dE1 block should be created. This determination may be based upon an analysis of stored operations, logical or physical, or may be based upon instantaneous operations. The statistics considered may include the occurrences of garbage collection operations, number of E1 blocks created or the number of non-sequential single sector write operations within a given LBA range. A dE1 block is dedicated for a certain block when the number and frequency of updates of data in that certain block are much higher than is typical for a majority of the blocks in the system. If a dE1 is to be allocated as a result, this is done in a step 123 in accordance with the flowchart of FIG. 20.

But if there is no room in an existing dE1 block and it is determined not to allocate another, then room in an existing E1 block associated with the LBA of the pending write operation is sought, in a step 125. E1 blocks may be individually limited to storing data sectors of a specific range of LBAs in order to make them easier to manage, such as providing one in each plane as described above. Alternately, E1 blocks may store data with LBAs from anywhere within the array. If there is enough space for the data, then, in a next step 127, that data is written into the E1 block associated with the LBA of the data.

If, on the other hand, the E1 block associated with the LBA of the data does not have room, space is sought in another E1 block, as indicated by a step 129. If such space exists, a decision is then made as to whether to expand the range of LBAs handled by the other E1 block to include the LBA of the current data. Depending upon usage patterns of the host, it may be better either to store data with any LBAs in any of several or all of the E1 blocks in the system, or to strictly limit each E1 block to a set range of LBAs. If it is decided to write the data to another E1 block, this is done in the step 127. However, if it is decided not to write the data to another E1 block, then a new E1 block is allocated, per step 131, and the data written into it in the step 127.

A routine for allocating a new block in any of the steps 115, 123 or 131 is shown by the flowchart of FIG. 20. If it is determined in an initial step 133 that a memory block is available in the pool of erased and unused blocks, then such a block is assigned in a step 135 to be an E2, dE1 or E1 block, depending upon which of the respective steps 115, 123 or 131 of FIG. 19 is being executed. However, if no such block is available, an existing E1, dE1 or E2 block is deallocated and reassigned the new role. The remaining steps of FIG. 20 decide whether it is an E1, dE1 or E2 block that is deallocated for this purpose. The principle applied in this example is to deallocate a block that is the least used and useful.

If a new E1 block is being created, when the processing of FIG. 19 is in the step 131, it is then determined, in a step 139 of FIG. 20, whether a maximum number of E1 blocks already exists. This number may be set or, preferably, changes in order to optimize usage of all three of these types of blocks. The total number of E1, dE1 and E2 blocks that are designated is generally limited by the number of extra blocks provided in the system over what is required to respond to its full logical address space. If it is determined that a maximum number of E1 blocks have been created, then a next step 141 deallocates an existing E1 block and, in the step 135, this block is designated as the new E1 block. However, if it is determined in the step 139 that the maximum number of E1 blocks have not been created, it is then decided in later steps whether to deallocate a dE1 block or an E2 block for the new E1 block. The new E1 block may be limited for use with a specified range of LBAs or may cover the entire memory array.

If a new dE1 block is being created (step 123 of FIG. 19) instead of an E1 block, as determined by a step 143, a question resolved in a step 145 is whether the maximum allowable number of dE1 blocks already exists. If so, one of them is deallocated in a step 147 and assigned as the new dE1 block in the step 135. If not, a step 149 is reached wherein usage pattern statistics are used to determine whether an existing dE1 block should be deallocated. The statistics may include a measure whether the existing dE1 block is stale.

The step 149 is also reached from the step 143 when neither a new dE1 nor a new E1 block is being created, and from the step 139 when the maximum numbers of E1 blocks have not been created. If it is determined in the step 149 to deallocate a dE1 block, then this is done in the step 147 and that block is reallocated in the step 135 as one of the new E1 or dE1 blocks being created. But if an existing dE1 block is not to be deallocated, then step 151 is reached wherein an E2 block is deallocated, followed by assigned that block as the new E1 or dE1 block. When assigned as a dE1 block, it may be assigned a LBN range that exceeds that of a single other physical block.

Although the invention has been described with respect to various exemplary embodiments, it will be understood that the invention is entitled to protection within the full scope of the appended claims.

It is claimed:

1. A method of writing data into a non-volatile memory system of a type having blocks of memory cells that are simultaneously erasable and which individually store a given number of host units of data, comprising:

designating a first of the blocks for storage of a number of units of data with sequential logical addresses that is less than a pre-set proportion of the given number, the pre-set proportion being less than the given number, thereafter responding to a plurality of successive host commands to write a number of units of data less than the pre-set proportion of the given number that have sequential logical addresses by writing their data into the first designated block with sequential physical addresses, and responding to host commands to write a number of units of data having sequential logical addresses that is equal to or in excess of the pre-set proportion of said given number by writing their data into a block other than the first designated block.

2. The method of claim 1, which additionally comprises, prior to writing data of the plurality of successive host commands:

determining whether or not the successive host commands individually include a number of units of data having sequential logical addresses less than the pre-set proportion of said given number.

3. The method of claim 2, wherein the pre-set proportion is set within a range of 25-75 percent of said given number.

4. The method of claim 1, wherein the non-volatile memory cells are organized into multiple sub-arrays and said blocks of memory cells include memory cells of two or more of the sub-arrays.

5. The method of claim 1, wherein the pre-set proportion is set within a range of 25-75 percent of said given number.

6. A method of writing data into a non-volatile memory system of a type having blocks of memory cells that are simultaneously erasable and which individually store a given number of host units of data, comprising:

designating at least a first one of the blocks to store a number of units of data having sequential logical addresses that is less than a pre-set fraction of said given number, thereafter responding to a plurality of successive host commands to individually write units of data into the memory system by determining whether a number of the units of data with sequential logical addresses is less than the pre-set fraction, and, if so, by writing the data into the first dedicated block, and responding to host commands to write units of data having a number of sequential logical addresses that is equal to or in excess of the pre-set fraction of said given number by writing the data into a block other than the first dedicated block.

7. The method of claim 6, wherein the non-volatile memory cells are organized into multiple sub-arrays and said blocks of memory cells include memory cells of two or more of the sub-arrays.

8. The method of claim 6, wherein the fraction is set within a range of 25-75 percent of said given number.

9. A method of operating a non-volatile memory system in response to commands received from a host to individually write logically addressed units of data therein, the memory system having memory cells grouped into blocks of memory cells that are simultaneously erasable and which individually store a given number of units of data at individual physical addresses, the logical addresses of received units of data being mapped within the memory system into corresponding physical addresses where the received units of data are stored, comprising:

allocating a first one of the blocks to store units of data having a number of sequential logical addresses less than a pre-determined fraction of said given number, allocating a second one of the blocks to store units of data having a number of sequential logical addresses equal to or in excess of the fraction of said given number, in response to receipt of a command to write data having a number of sequential logical addresses less than said fraction, determining whether the first block has sufficient erased capacity to store the received data and, if so, writing the received data into sequential physical addresses of the first block, and in response to receipt of a command to write data having a number of sequential logical addresses equal to or in excess of said fraction, determining whether the second block has erased capacity to store the data and, if so, writing the data into sequential physical addresses of the second block.

10. The method of claim 9, additionally comprising:

in response to receipt of the command to write data having a number of sequential logical addresses less than said fraction, if the first block does not have sufficient erased capacity to store the received data, allocating a third one of the blocks to store units of data having a number of sequential logical addresses less than a fraction of said given number and then writing the received data into sequential physical addresses of the third block, and in response to receipt of the command to write data having a number of sequential logical addresses equal to or in excess of said fraction, if the second block does not have sufficient erased capacity to store the received data, allocating a fourth one of the blocks to store units of data having a number of sequential logical addresses equal to or in excess of the fraction of said given number and then writing the received data into sequential physical addresses of the fourth block.

11. The method of claim 10, wherein the fraction is set to be within a range of 25-75 percent of said given number.

12. The method of claim 9, wherein the non-volatile memory cells are organized into multiple sub-arrays and said blocks of memory cells include memory cells of two or more of the sub-arrays.

13. The method of claim 9, wherein the fraction is set to be within a range of 25-75 percent of said given number.

14. A method of writing data into a non-volatile memory system of a type having blocks of memory cells that are simultaneously erasable and which individually store a given number of host units of data, comprising:

designating at least a first one of the blocks to store a number of units of data received by the memory system with individual ones of multiple write commands that have sequential logical addresses less than a pre-set fraction of said given number, responding to the receipt of multiple commands by the memory system to individually write one or more units of data thereinto by, for individual commands, (a) determining whether the command specifies the writing of a number of units of data having sequential logical addresses that is less than the pre-set fraction, and (b) determining whether the first block has enough erased capacity to store the number of units of data provided with the command, wherein when both of conditions (a) and (b) above are determined to exist, thereafter writing the units of data into the first block, but when either one of conditions (a) or (b) above is determined not to exist, writing the units of data into one of the blocks other than the first block.

15. The method of claim 14, wherein the pre-set fraction is within a range of 25-75 percent of said given number.

16. The method of claim 14, additionally comprising:

designating at least a second one of the blocks to store a number of units of data received by the memory system with individual ones of multiple write commands that have sequential logical addresses equal to or greater than the pre-set fraction, and responding to the receipt of multiple commands by the memory system to individually write one or more units of data thereinto by additionally, for individual commands, (c) determining whether the command specifies the writing of a number of units of data greater than the given number, wherein when neither of the conditions (a) nor (c) above exist, writing the units of data into the second block, without regard to whether condition (b) exists or not, but when the condition (c) above is determined to exist, writing the units of data into one of the blocks other than the first or second blocks.

17. The method of claim 16, wherein the pre-set fraction is set to be within a range of 25-75 percent of said given number.

18. In a non-volatile memory system having memory cells grouped into blocks of memory cells that are simultaneously erasable and which individually store a given number of units of data at individual physical addresses, the logical addresses of received units of data being mapped within the memory system into corresponding physical addresses where the received units of data are stored, a method of operation in response to received commands to individually write logically addressed units of data therein, comprising:

designating a first one of the blocks to store units of data having a number of sequential logical addresses that is less than a pre-determined fraction of said given number, designating a second one of the blocks to store units of data having a number of sequential logical addresses that is greater than the fraction of said given number, providing at least another one of the blocks that is fully erased, and in response to receipt of a command to write data into the memory system, identifying the number of units of the data that have sequential logical addresses, determine whether the number of such units with sequential logical addresses are less than the fraction, and, if so, writing the data to the first of the blocks, but if the amount of data is not less than the fraction, then writing the data to the second of the blocks if there is sufficient capacity therein, but if there is not sufficient capacity in the second of the blocks, writing the data to the fully erased block.

19. The method of claim 18, wherein the pre-predetermined fraction is set to be within a range of 25-75 percent of said given number.

* * * * *